(12) United States Patent
Babich et al.

(10) Patent No.: US 11,258,642 B2
(45) Date of Patent: Feb. 22, 2022

(54) GEAR SHIFTING IN A SKYWAVE SYSTEM

(71) Applicant: Skywave Networks LLC, Chicago, IL (US)

(72) Inventors: Kevin J. Babich, Valparaiso, IN (US); Terry Lee Vishloff, Anmore (CA)

(73) Assignee: Skywave Networks LLC, Chicago, IL (US)

(*) Notice: Subject to any disclaimer, the term of this patent is extended or adjusted under 35 U.S.C. 154(b) by 0 days.

(21) Appl. No.: 15/929,162

(22) Filed: Nov. 14, 2019

(65) Prior Publication Data

US 2020/0328918 A1 Oct. 15, 2020

Related U.S. Application Data

(60) Provisional application No. 62/767,179, filed on Nov. 14, 2018.

(51) Int. Cl.
*H04L 27/00* (2006.01)
*H04B 17/336* (2015.01)
(Continued)

(52) U.S. Cl.
CPC ......... *H04L 27/0008* (2013.01); *G06Q 40/02* (2013.01); *H04B 17/336* (2015.01);
(Continued)

(58) Field of Classification Search
CPC . H04L 27/0008; H04L 27/01; H04L 43/0823; H04L 43/0852; H04L 27/366;
(Continued)

(56) References Cited

U.S. PATENT DOCUMENTS 4,320,387 A * 3/1982 Powell .................. G04G 21/00
379/93.12
7,298,784 B2 11/2007 Matsusaka
(Continued)

FOREIGN PATENT DOCUMENTS

WO 20111112158 A1 9/2011

OTHER PUBLICATIONS

Arikan, Toros, Thesis—Minimum-Delay HF Communications, University of Illinois at Urbana-Champaign, 60 pages Retrieved from the Internet: https://www.ideals.illinois.edu/bitstream/handle/2142/97507/ARIKAN-THESIS-2017.pdf?sequence=1, Nov. 28, 2017.
(Continued)

*Primary Examiner* — Kabir A Timory
(74) *Attorney, Agent, or Firm* — Woodard, Emhardt, Henry, Reeves & Wagner, LLP

(57) ABSTRACT

A gear shifting technique has been developed in which modulation and equalization are shifted to achieve optional performance. In one form, two or more equalizers, each associated with a demodulator and message decoder, determine if the modulation being used can be increased in complexity in order to increase the channel throughput or determine if the modulation method should be reduced in complexity in order to improve the receiver error performance. The quality metrics can based on which equalizer-demodulator-decoder is set to first detect a valid message. Other factors can be considered with this technique such as a packet-error ratio and a signal-to-noise ratio. In a financial trading system, message erasures can be favored over errored messages by limiting the number of bit or symbol corrections permitted per message to less than the maximum possible for the selected decoding schemes.

36 Claims, 15 Drawing Sheets

(51) Int. Cl.
*G06Q 40/02* (2012.01)
*H04L 27/01* (2006.01)
*H04L 43/0823* (2022.01)
*H04L 43/0852* (2022.01)
*H04L 27/36* (2006.01)

(52) U.S. Cl.
CPC .......... *H04L 27/01* (2013.01); *H04L 43/0823* (2013.01); *H04L 43/0852* (2013.01); *H04L 27/366* (2013.01)

(58) Field of Classification Search
CPC ..... H04L 25/03019; H04L 2025/03726; H04L 1/203; H04L 1/24; H04L 1/0025; H04L 1/0003; H04B 17/336; G06Q 40/02
See application file for complete search history.

(56) References Cited

U.S. PATENT DOCUMENTS

| | | | |
|---|---|---|---|
| 7,310,531 B2 | 12/2007 | Uchida | |
| 7,469,013 B1 | 12/2008 | Bolt et al. | |
| 9,128,858 B1 | 9/2015 | Micheloni et al. | |
| 9,136,938 B1 | 9/2015 | Babich | |
| 2002/0114385 A1* | 8/2002 | Gu | H04L 25/03038 375/231 |
| 2004/0224657 A1* | 11/2004 | Matsusaka | H04B 1/1036 455/278.1 |
| 2007/0218863 A1* | 9/2007 | Futatsugi | H04L 1/0003 455/403 |
| 2007/0248038 A1* | 10/2007 | Yamasaki | H04B 7/022 370/328 |
| 2014/0086588 A1 | 3/2014 | Kawanishi et al. | |
| 2014/0294128 A1* | 10/2014 | Umeda | H04L 25/0224 375/346 |
| 2017/0367006 A1* | 12/2017 | Ino | H04L 1/0003 |
| 2018/0302250 A1* | 10/2018 | Iqbal | H04L 25/03057 |
| 2020/0244352 A1 | 7/2020 | Babich | |
| 2020/0328841 A1 | 10/2020 | Babich et al. | |
| 2020/0328844 A1 | 10/2020 | Babich et al. | |
| 2020/0328919 A1 | 10/2020 | Babich et al. | |
| 2020/0366367 A1 | 11/2020 | Babich | |
| 2021/0058150 A1 | 2/2021 | Babich | |
| 2021/0058151 A1 | 2/2021 | Babich | |
| 2021/0067239 A1 | 3/2021 | Babich | |
| 2021/0075494 A1 | 3/2021 | Babich | |
| 2021/0075502 A1 | 3/2021 | Babich | |
| 2021/0075562 A1 | 3/2021 | Babich | |
| 2021/0075584 A1 | 3/2021 | Babich | |
| 2021/0105044 A1 | 4/2021 | Babich | |

OTHER PUBLICATIONS

PCT, Intl. App. No. PCT/US2019/070008, Written Opinion of the International Searching Authority, 10 pages, dated Mar. 10, 2020.
PCT, Intl. App. No. PCT/US2019/070008, International Search Report, 4 pages, dated Mar. 10, 2020.

* cited by examiner

TABLE 1

| User Payload | CRC | Total Payload | FEC Rate | Encoded bits | Mode # | Modulation | Payload Symbols | Packet Length | Data Rate | Packets per Second |
|---|---|---|---|---|---|---|---|---|---|---|
| [bits] | [bits] | [bits] | | [bits] | | | [symb] | [ms] | [bits/s] | |
| 64 | 8 | 72 | 0.72 | 100 | 4 | 16-QAM | 25 | 3.1 | 20 480.0 | 320.00 |
| 64 | 8 | 72 | 0.6 | 120 | 5 | 32-QAM | 24 | 3.0 | 21 333.3 | 333.33 |
| 64 | 8 | 72 | 0.66667 | 108 | 6 | 64-QAM | 18 | 2.3 | 28 444.4 | 444.44 |
| 64 | 8 | 72 | 0.68571 | 105 | 7 | 128-QAM | 15 | 1.9 | 34 133.3 | 533.33 |
| 64 | 8 | 72 | 0.75 | 96 | 8 | 256-QAM | 12 | 1.5 | 42 666.7 | 666.67 |
| 64 | 8 | 72 | 0.8 | 90 | 9 | 512-QAM | 10 | 1.3 | 51 200.0 | 800.00 |

*Fig. 8*

TABLE 2

| Variable | Type & Range | Notes |
|---|---|---|
| Mode-X | Int. 1 - 9 | The operating mode of the link, i.e. the modulation & FEC settings. |
| $N_{TRIES}$ | Int. 1 - 99 | A variable indicating the number of times something should be attempted. The Meaning of $N_{TRIES}$ is process dependent. |
| $N_{PROBE}$ | Int. 1 - 99 | Number of probes to send before deciding on a gear shift change |
| $T_{PROBE}$ | Real, 0 - 10 000 mSec | Period between probes |
| EQ-X | Int. X=1,2, or 3 | The equalizer. |
| EQ-X-Length | Real, 0-20 mSec | The length of the equalizer. (20 mSec = 30% of time to traverse ½ the Earth's circumference). |
| $T_{ADV}$ | Real, 0-20 mSec | Time advantage as measured by T16-T9. |
| $T_{DIM}$ | Real, 0-20 mSec | The point of diminishing returns. At $T_{DIM}$ there is no further advantage in increasing $T_{ADV}$. |
| $T_{MIN}$ | Real, 0-20 mSec | The minimum value of $T_{ADV}$ needed for successful operation of the Skywave network. |
| $T_{SHIFT}$ | Real, 0 - 1000 mSec | The gear-shift algorithm, should begin after this period passes. |
| PER | Fraction, 0 - 1 | Packet Error Rate. 0 => no messages being received properly and 1 => no errors. |
| $PER_{MAX}$ | Fraction, 0 - 1 | Maximum permissible PER after which a downward gear change is to be attempted. |
| $PER_{MIN}$ | Fraction, 0 - 1 | A value of PER below which an upward gear change may be warranted. |
| $R_{MES}$ | Real, 100 - 1000 | Theoretical number of messages per second expected. |
| $Val_S$ | Real >0 | Expected value of a successful transaction. Units are not specifically currency, but are related to currency. In addition to the possibility of $T_{ADV}$ changing the value of the successful packet the value will be lower for the shorter messages of Modes 1,2, and 3 than the value of 4 through 9. |
| $Val_M$ | Real ≤0 | Expected value of a missed transaction. Units are not specifically currency, but are related to currency. 0 => no cost only lost opportunity. |
| $Val_E$ | Real <0 | Expected value of incorrectly decoding a corrupt message (or noise) as a Valid Message. This will be a negative value, i.e. a cost. |
| $SNR-X_{MIN}$ | dB ratio >0 | SNR required for meeting PER target. SNR is a function of the chosen mode of operation. |

*Fig. 14*

GEAR SHIFTING IN A SKYWAVE SYSTEM

CROSS REFERENCE TO RELATED APPLICATIONS

This application claims the benefit of U.S. Provisional Patent Application No. 62/767,179, filed on Nov. 14, 2018, which is hereby incorporated by reference.

BACKGROUND

Typical over the air (OTA) radio transmissions can have significant latencies when transmitted over long distances such as across oceans. Moreover, these transmission channels can be rather noisy which in turn increases the need for error correction. High frequency (HF) radio communication channels of most long-distance communication systems are limited by the available assigned radio bandwidth and channel capacity at any given time. When using the HF radio channel in a financial high-frequency trading application, this limited bandwidth can cause delays in the receipt of financial instructions which in turn can be financially detrimental.

Thus, there is a need for improvement in this field.

SUMMARY

A unique gear shifting technique has been developed in which the modulation mode and equalization are shifted to achieve optional performance. In one form, three or more equalizers, each associated with a demodulator and message decoder, determine if the modulation being used can be increased in complexity in order to increase the channel throughput or determine if the modulation method should be reduced in complexity in order to improve the receiver error performance. The quality metric can be based on which equalizer-demodulator-decoder is set to first detect a valid message. Modulation complexity can be increased when a shorter equalizer detects a sufficient number of error free packets ahead of the current designated equalizer. Modulation complexity is decreased when a longer equalizer detects a higher number of error-free packets as compared to the current designated equalizer. Other factors can be considered with this technique such as a packet-error ratio and a signal-to-noise ratio. In a financial trading system, message erasures can be favored over errored messages by limiting the number of bit or symbol corrections permitted per message to less than the maximum possible for the selected decoding schemes.

The system and techniques as described and illustrated herein concern a number of unique and inventive aspects. Some, but by no means all, of these unique aspects are summarized below.

Aspect 1 generally concerns a method that includes receiving at a communication system an indicator indicating a change to a different modulation mode will potentially provide a system benefit.

Aspect 2 generally concerns the method of any previous aspect in which the communication system includes two or more demodulator-equalizer units.

Aspect 3 generally concerns the method of any previous aspect which includes shifting at least one of the demodulator-equalizer units to the different modulation mode.

Aspect 4 generally concerns the method of any previous aspect in which the indicator includes signal-to-noise ratio (SNR).

Aspect 5 generally concerns the method of any previous aspect in which the indicator includes packet error rate (PER).

Aspect 6 generally concerns the method of any previous aspect in which the indicator includes financial performance of the communication system.

Aspect 7 generally concerns the method of any previous aspect in which the indicator includes a diminishing returns delay time limit.

Aspect 8 generally concerns the method of any previous aspect in which the indicator includes a system delay advantage.

Aspect 9 generally concerns the method of any previous aspect in which the indicator includes a minimum delay time limit.

Aspect 10 generally concerns the method of any previous aspect in which the indicator includes inter-symbol interference (ISI).

Aspect 11 generally concerns the method of any previous aspect in which the different modulation mode has higher complexity.

Aspect 12 generally concerns the method of any previous aspect in which the system benefit includes higher channel throughput.

Aspect 13 generally concerns the method of any previous aspect in which the shifting includes upshifting to the different modulation mode with the higher complexity.

Aspect 14 generally concerns the method of any previous aspect in which the different modulation mode has lower complexity.

Aspect 15 generally concerns the method of any previous aspect in which the system benefit includes better error performance.

Aspect 16 generally concerns the method of any previous aspect in which the shifting includes downshifting to the different modulation mode with the lower complexity.

Aspect 17 generally concerns the method of any previous aspect which includes probing the different modulation mode with the one of the demodulator-equalizer units before shifting the remaining demodulator-equalizer units.

Aspect 18 generally concerns the method of any previous aspect which includes sending a financial instrument transaction instruction via the communication system.

Aspect 19 generally concerns the method of any previous aspect which includes limiting a number of error corrections per message to less than a maximum possible for a selected decoding scheme.

Aspect 20 generally concerns the method of any previous aspect in which the shifting includes changing equalizer processing time in the demodulator-equalizer units.

Aspect 21 generally concerns the method of any previous aspect in which changing the equalizer processing time includes decreasing the equalizer processing time.

Aspect 22 generally concerns the method of any previous aspect in which the changing the equalizer processing time includes increasing the equalizer processing time.

Aspect 23 generally concerns the method of any previous aspect in which the demodulator-equalizer units include a first demodulator-equalizer unit, a second demodulator-equalizer unit, and a third demodulator-equalizer unit.

Aspect 24 generally concerns the method of any previous aspect in which the first demodulator-equalizer unit has a equalizer with an equalizer processing time that is shorter than the other demodulator-equalizer units.

Aspect 25 generally concerns the method of any previous aspect in which the determining a packet error rate for the first demodulator-equalizer unit is below a minimum limit.

Aspect 26 generally concerns the method of any previous aspect which includes instructing a modulator at a remote transmitter station to change to the different modulation mode.

Aspect 27 generally concerns the method of any previous aspect which includes changing the second demodulator-equalizer unit and the third demodulator-equalizer unit to the different modulation mode.

Aspect 28 generally concerns the method of any previous aspect which includes changing equalizer processing time of the second demodulator-equalizer unit to the short equalizer processing time of the first demodulator-equalizer unit.

Aspect 29 generally concerns the method of any previous aspect in which the third demodulator-equalizer unit has a third equalizer with a long equalizer processing time that is longer than the other demodulator-equalizer units.

Aspect 30 generally concerns the method of any previous aspect which includes determining a packet error rate for the third demodulator-equalizer unit is below a minimum limit.

Aspect 31 generally concerns the method of any previous aspect which includes changing the first demodulator-equalizer unit and the second demodulator-equalizer unit to the different modulation mode.

Aspect 32 generally concerns the method of any previous aspect which includes changing equalizer processing time of the second demodulator-equalizer unit to the long equalizer processing time of the third demodulator-equalizer unit.

Aspect 33 generally concerns a system for performing the method of any previous aspect.

Further forms, objects, features, aspects, benefits, advantages, and embodiments of the present invention will become apparent from a detailed description and drawings provided herewith.

BRIEF DESCRIPTION OF THE DRAWINGS

FIG. 8 is a table of modulation mode information.

FIG. 14 is a table of variables used in the gear shifting technique.

DETAILED DESCRIPTION OF SELECTED EMBODIMENTS

Figure 1:
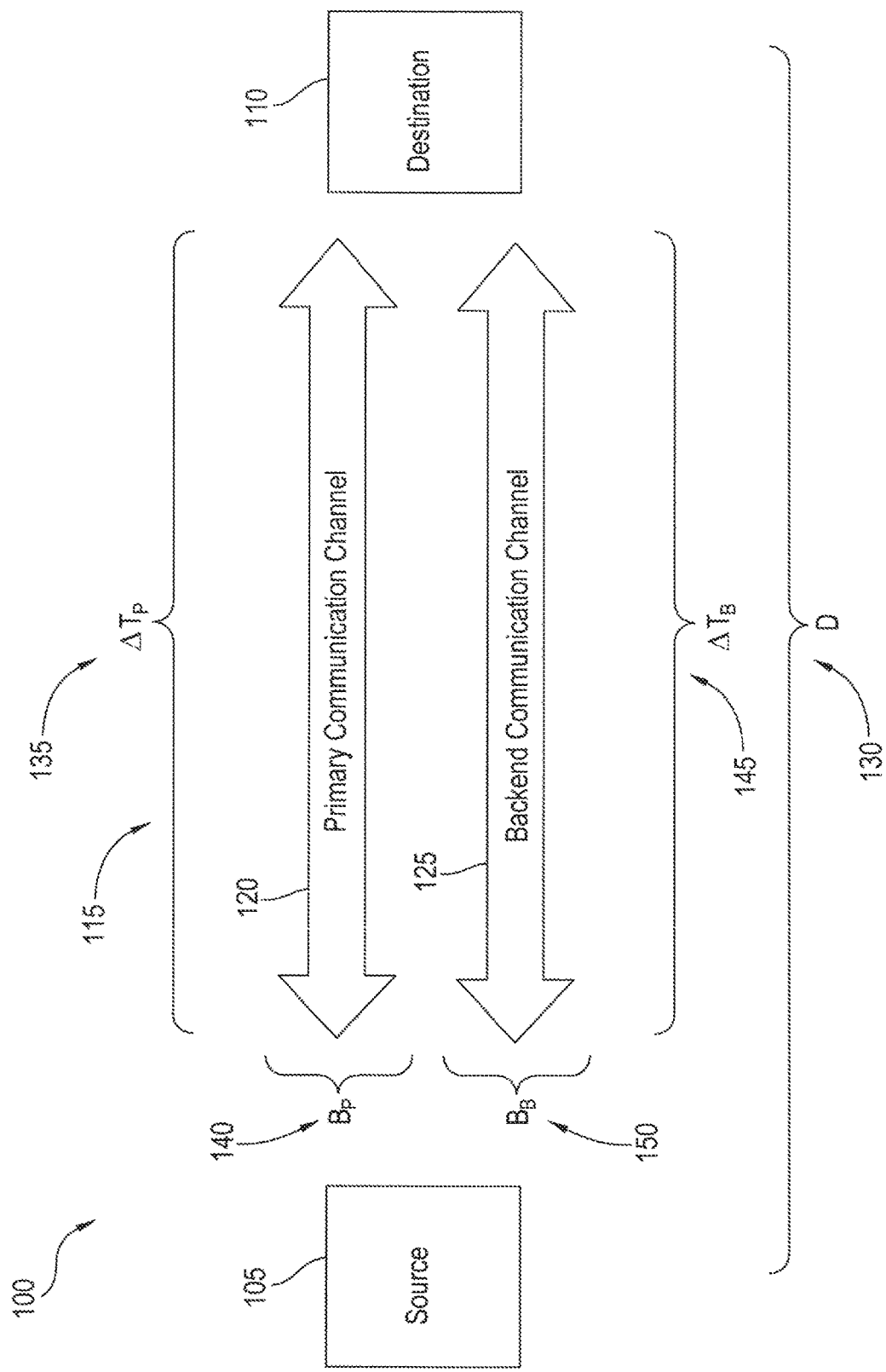
FIG. 1 is a diagrammatic view of a communication system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a generic version of a communication system 100 according to one example. As shown, the communication system 100 includes an information source 105 and an information destination 110. The information source 105 and information destination 110 operatively communicate with one another through one or more communication channels 115. Communication over these communication channels 115 can be one-way type communications and/or two-way type communications. In the illustrated example, the communication channels 115 between the information source 105 and information destination 110 include a primary communication channel 120 and a backend communication channel 125. In other examples, the communication system 100 can include just a single communication channel 115 or more than two communication channels 115.

As will be explained in further detail below, the communication system 100 can be used in a number of situations, especially in situations where the information source 105 and information destination 110 are located physically remote from one another. The communication system 100 for instance can be used for private, commercial, medical, military, and/or governmental purposes. For the purposes of explanation, the communication system 100 will be described for use with a financial trading system, but it should be recognized that the communication system 100 can be adapted for other uses such as for issuing military commands and performing remote telemedicine procedures. In this example, the information source 105 and information destination 110 generally represent the locations of the computer systems for remotely located stock/commodity exchanges and/or financial institutions that trade on those exchanges. Some examples of these exchanges include the New York Stock Exchange (NYSE), the NASDAQ Stock Market, Tokyo Stock Exchange (TYO), the Shanghai Stock Exchange, the Hong Kong Stock Exchange, Euronext, London Stock Exchange, Shenzhen Stock Exchange, Toronto Stock Exchange, Bombay Stock Exchange, Chicago Mercantile Exchange (CME), Chicago Board of Trade (CBOT), and the New York Mercantile Exchange (NYMEX), to name just a few.

As shown in FIG. 1, the information source 105 and information destination 110 are physically separated by a distance (D) 130. For instance, the exchanges represented by the information source 105 and information destination 110 can be separated by mountains, continents, and even oceans. This physical distance 130 creates a delay or latency in communications between the information source 105 and information destination 110 locations. Normally, but not always, the greater the distance 130, the longer the latency for a given communication channel 115. In most cases, the distance 130 between these exchanges prevents direct line of sight communications which further increases latency as well as increases the risk for communication errors. For instance, the information destination 110 can be located past the radio horizon for the information source 105. With trading as well as other activities, time and communication accuracy are crucial. Any delays can cause traders to lose money, and likewise, any communication errors can cause a loss. Communication errors can be reduced but usually at the cost of higher latency and/or greater bandwidth requirements. Most communication channels 115 have limited bandwidth to some degree. The latency and bandwidth capabilities can vary depending on the construction and type of communication channel 115.

As can be seen, the primary communication channel 120 has a primary channel latency ($\Delta T_P$) 135 and a primary channel bandwidth ($B_P$) 140. The backend channel latency 145 primary communication channel 120 has a backend channel latency ($\Delta T_B$) 145 and a backend channel bandwidth ($B_B$) 150. The communication channels 115 in FIG. 1 can have the same latency and bandwidth properties or different latency and/or bandwidth as well as other properties. In one example, the primary channel latency 135 of the primary communication channel 120 is less than the backend channel latency 145 of the backend communication channel 125, and the primary channel bandwidth 140 of the primary communication channel 120 is less than the backend channel bandwidth 150 of the backend communication channel 125. In some variations of this example, the primary communication channel 120 is a wireless communication channel (e.g., radio), and the backend communication channel 125 is a wired type communication channel (e.g., fiber optic cable). In one particular form, the primary communication channel 120 uses a skywave communication technique, and the backend communication channel 125 includes a non-skywave path such as a fiber optic cable. In other examples, the primary communication channel 120 and backend communication channel 125 represent different communication channels 115 for the same type of communication mode. For instance, primary communication channel 120 and backend communication channel 125 represent wireless communication channels having different frequency bands, and in one example, both communication channels 115 utilize high frequency (HF) radio to communicate via skywave propagation. With the primary communication channel 120 and backend communication channel 125 having different frequencies, the primary communication channel 120 and backend communication channel 125 can have different latencies, bandwidths, and/or communication error rates. For instance, the primary communication channel 120 in one situation can be noisier than the backend communication channel 125, but the primary communication channel 120 can have a shorter latency than the backend communication channel 125.

The HF radio communication channel 115 of the communication system 100 can be limited by the available assigned radio bandwidth and channel capacity at any given time. When using the HF radio communication channel 115 in a financial high frequency trading application, increasing the number and/or transmission speed of messages increases the profit potential of the communication system 100.

Figure 2:
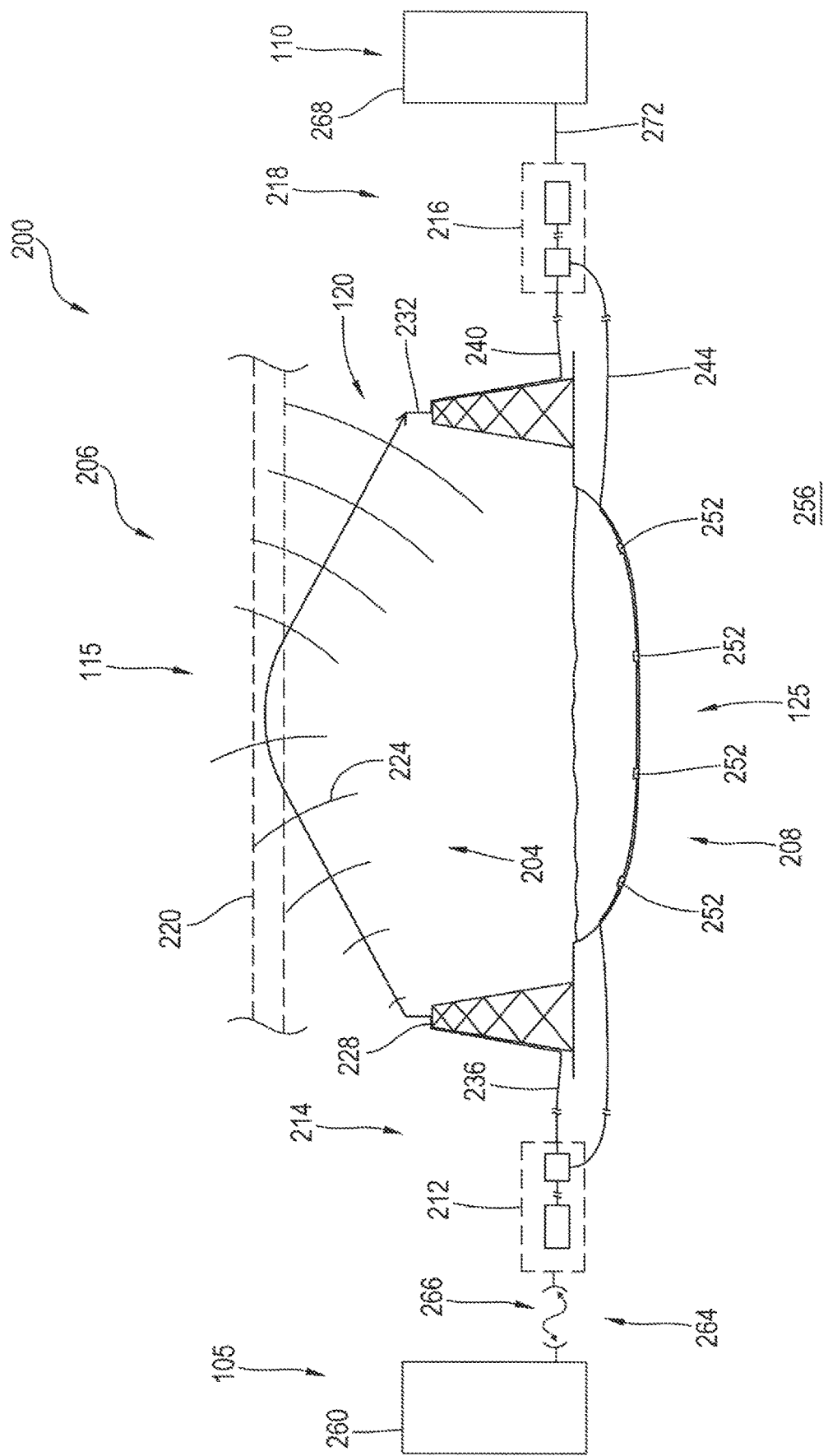
FIG. 2 is a diagrammatic view of a communication system according to another example.

FIG. 2 illustrates a specific example of a communication system 200 of the FIG. 1 communication system 100 configured to transfer data according to the unique technique described herein. Like in the FIG. 1 communication system 100, the communication system 200 in FIG. 2 includes the information source 105, information destination 110, and communication channels 115 that include the primary communication channel 120 and backend communication channel 125. Specifically, the communication system 200 in FIG. 2 is configured to transfer data via a low latency, low bandwidth communication link 204. In one form, the low latency, low bandwidth communication link 204 includes a high frequency radio channel (HF radio) 206. The communication system 200 in FIG. 2 is further configured to transfer data via a separate data via a high latency, high bandwidth communication link 208. The low latency, low bandwidth communication link 204 and high latency, high bandwidth communication link 208 provide separate connections between a first communication node 212 at a transmission station 214 and a second communication node 216 at a receiving station 218. The low latency, low bandwidth communication link 204 may be configured to transmit data using electromagnetic waves 224 passing through free space via skywave propagation between a transmitting antenna 228 and a receiving antenna 232. The electromagnetic waves 224 may be generated by a transmitter in the first communication node 212, passed along a transmission line 236 to the transmitting antenna 228. The electromagnetic waves 224 may be radiated by the transmitting antenna 228 encountering an ionized portion of the atmosphere 220. This radiated electromagnetic energy may then be refracted by the ionized portion of the atmosphere 220 causing the electromagnetic waves 224 to redirect toward the earth 256. The electromagnetic waves 224 may be received by the receiving antenna 232 coupled to the second communication node 216 by the transmission line 240. As illustrated in FIG. 2, a transmitting communication node may use skywave propagation to transmit electromagnetic energy long distances across the surface of the earth 256 without the need of one or more transmission lines 236 to carry the electromagnetic energy.

Data may also be transmitted between the transmission station 214 and receiving station 218 using the high latency, high bandwidth communication link 208. As illustrated in FIG. 2, the high latency, high bandwidth communication link 208 may be implemented using a transmission line 244 passing through the earth 256, which may include passing under or through an ocean or other body of water. As shown in FIG. 2, the high latency, high bandwidth communication link 208 may include one or more repeaters 252. FIG. 2 illustrates four repeaters 252 along the transmission line 244 although any suitable number of repeaters 252 may be used. The transmission line 244 may also have no repeaters 252 at all. Although FIG. 2 illustrates the low latency, low bandwidth communication link 204 transmitting information from the first communication node 212 to the second communication node 216, the data transmitted may pass along the low latency, low bandwidth communication link 204 and high latency, high bandwidth communication link 208 in both directions.

As shown, the communication system 200 further includes a client 260 that has a connection 264 to the first communication node 212. The client 260 is configured to send instructions over the connection 264 to the first communication node 212. In the illustrated example, the connection 264 includes a wireless connection 266 such as a microwave network. At the first communication node 212, the instructions are prepared to be sent to the second communication node 216, either by the low latency, low bandwidth communication link 204 or the high latency, high bandwidth communication link 208, or both. As shown, the second communication node 216 is connected to an instruction processor 268 via a connection 272. It should be recognized that the connection 272 can include wireless connection 266 like a microwave or other type of wireless connection. The client 260 may be any business, group, individual, and/or entity that desires to send directions over a distance. The instruction processor 268 may be any business, group, individual, and/or entity that is meant to receive or act upon those instructions. In some embodiments, the connection 264 and connection 272 may be unnecessary as the client 260 may send the data to be transmitted directly from the first communication node 212 or the second communication node 216 may be connected directly to the instruction processor 268. The communication system 200 may be used for any kind of low-latency data transmission that is desired. As one example, the client 260 may be a doctor or surgeon working remotely while the instruction processor 268 may be a robotic instrument for working on a patient.

In some embodiments, the client 260 may be a financial instrument trader and the instruction processor 268 may be a stock exchange. The trader may wish to provide instructions to the stock exchange to buy or sell certain securities or bonds at specific times. Alternatively or additionally, the instructions are in the form of news and/or other information supplied by the trader and/or a third party organization, such as a news organization or a government. The trader may transmit the instructions to the first communication node 212 which sends the instructions and/or news to the second communication node 216 using the transmitting antenna 228, receiving antenna 232, and/or by the transmission line 244. The stock exchange can then process the actions desired by the trader upon receipt of the instructions and/or news.

The communication system 200 may be useful for high-frequency trading, where trading strategies are carried out on computers to execute trades in fractions of a second. In high-frequency trading, a delay of mere milliseconds may cost a trader millions of dollars; therefore, the speed of transmission of trading instructions is as important as the accuracy of the data transmitted. In some embodiments, the trader may transmit preset trading instructions or conditions for executing a trade to the second communication node 216, which is located within close proximity to a stock exchange, using the high latency, high bandwidth communication link 208 at a time before the trader wishes to execute a trade. These instructions or conditions may require the transmission of a large amount of data, and may be delivered more accurately using the high latency, high bandwidth communication link 208. Also, if the instructions or conditions are sent at a time prior to when a trade is wished to be executed, the higher latency of the high latency, high bandwidth communication link 208 can be tolerated.

The eventual execution of the instructions may be accomplished by the trader transmitting triggering data to the communication system 200 on which the instructions are stored. Alternatively or additionally, the triggering data can includes news and/or other information supplied by the trader and/or a separate, third party organization. Upon receipt of the triggering data, the trading instructions are sent to the stock exchange and a trade is executed. The triggering data that is transmitted is generally a much smaller amount of data than the instructions; therefore, the triggering data may be sent over the low latency, low bandwidth communication link 204. When the triggering data is received at the second communication node 216, the instructions for a specific trade are sent to the stock exchange. Sending the triggering data over the low latency, low bandwidth communication link 204 rather than the high latency, high bandwidth communication link 208 allows the desired trade to be executed as quickly as possible, giving the trader a time advantage over other parties trading the same financial instruments.

Figure 3:
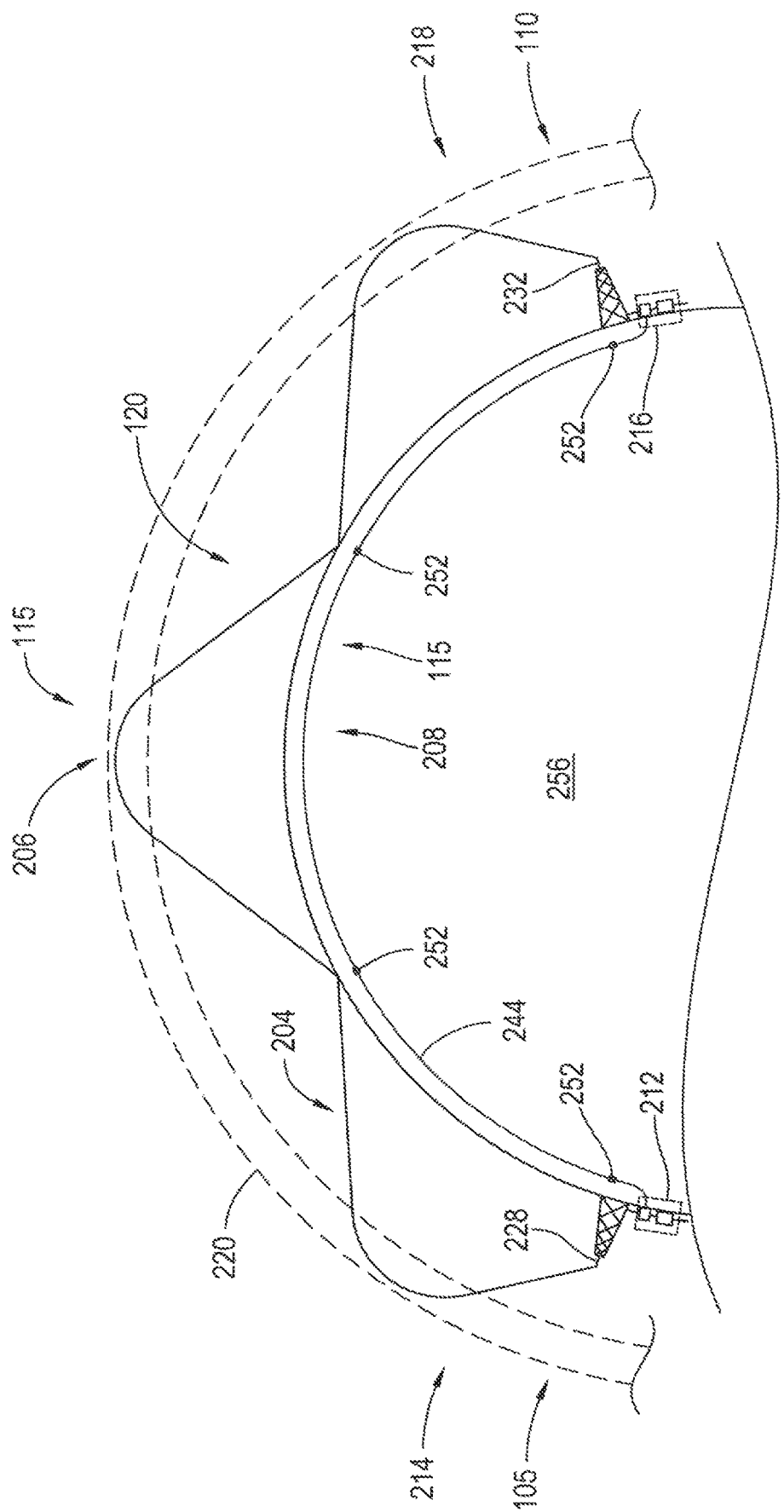
FIG. 3 is a side view of the FIG. 2 communication system in one variation.

The configuration shown in FIG. 2 is further illustrated in FIG. 3 where the first communication node 212 and the second communication node 216 are geographically remote from one another separated by a substantial portion of the surface of the earth 256. This portion of the earth's surface may include one or more continents, oceans, mountain ranges, and/or other geographic areas. For example, the distance spanned in FIG. 2 may cover a single continent, multiple continents, an ocean, and the like. In one example, the first communication node 212 is in Chicago, Ill. in the United States of America, and the second communication node 216 is in London, England, in the United Kingdom. In another example, the first communication node 212 is in New York City, N.Y., and second communication node 216 is in Los Angeles, Calif., both cities being in North America. As shown, the transmitting antenna 228 and receiving antenna 232 are separated by a distance greater than the radio horizon such that no line of sight communications can be made. Instead, a skywave communication technique is used in which the electromagnetic waves 224 of the low latency, low bandwidth communication link 204 are skipped multiple times between the transmitting antenna 228 and receiving antenna 232. Any suitable combination of distance, communication nodes, and communications links is envisioned that can provide satisfactory latency and bandwidth.

FIG. 2 illustrates that skywave propagation allows electromagnetic energy to traverse long distances. Using skywave propagation, the low latency, low bandwidth communication link 204 transmits the electromagnetic waves 224 into a portion of the atmosphere 220 that is sufficiently ionized to refract the electromagnetic waves 224 toward the earth 256. The waves may then be reflected by the surface of the earth 256 and returned to the ionized portion of the upper atmosphere 220 where they may be refracted toward earth 256 again. Thus electromagnetic energy may "skip" repeatedly allowing the low latency, low bandwidth signals electromagnetic waves 224 to cover distances substantially greater than those which may be covered by non-skywave propagation.

Figure 4:
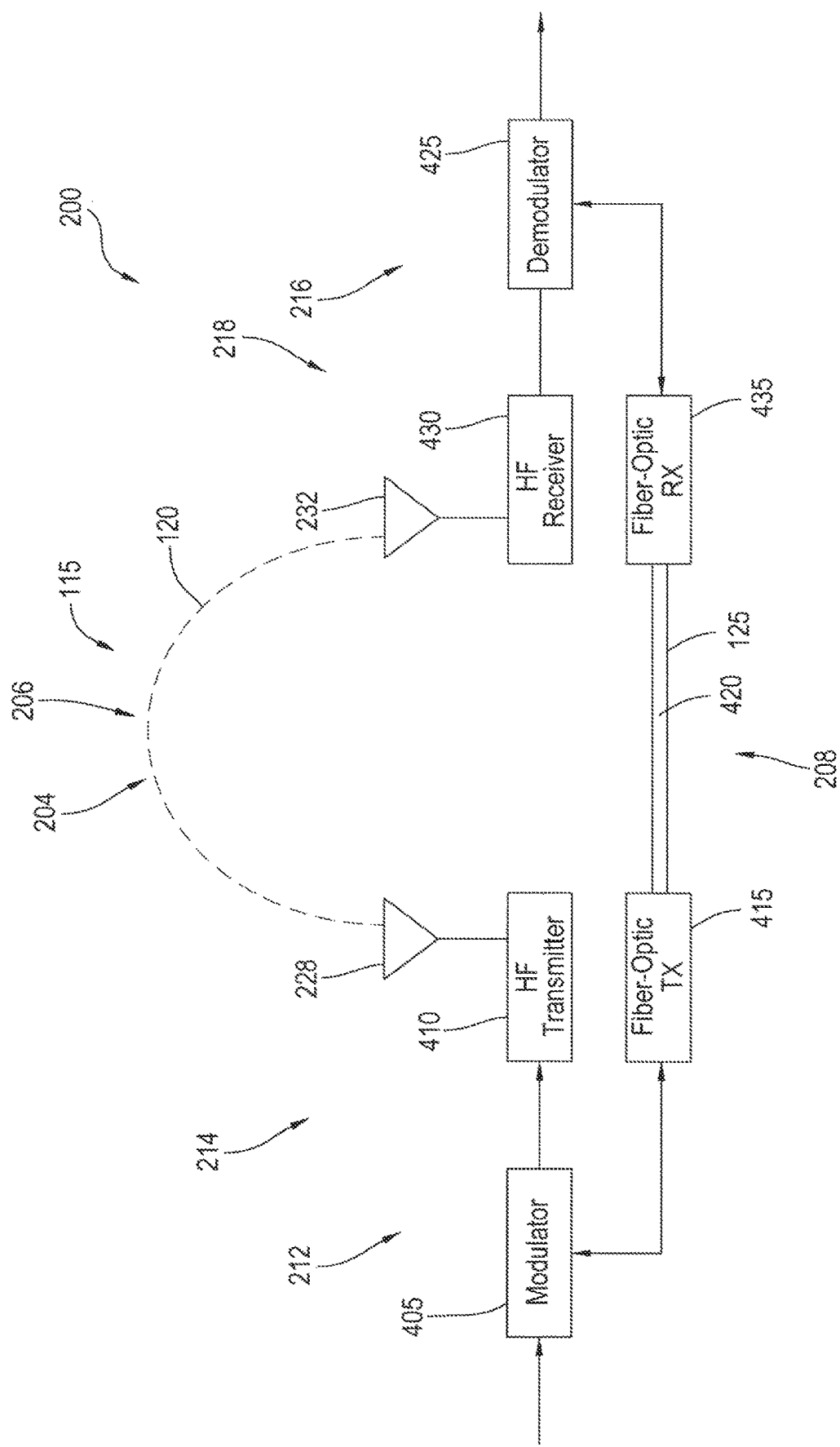
FIG. 4 is a diagrammatic view of the FIG. 2 communication system showing further details.

FIG. 4 shows a specific implementation of the FIG. 2 communication system 200. As can be seen, the first communication node 212 at the transmission station 214 in FIG. 4 includes a modulator 405, a radio transmitter 410, and a fiber optic transmitter 415. The modulator 405 includes one or more processors and memory along with other electronics, software, and/or firmware configured to modulate the message and/or other information using the above-mentioned variable messaging length technique which will be further described below. The radio transmitter 410 is operatively connected to the modulator 405 so as to transmit the message and/or other data to the receiving station 218 via the transmitting antenna 228 over the HF radio channel 206. In the depicted example, the radio transmitter 410 transmits the message and/or other data via the primary communication channel 120. The fiber optic transmitter 415 is operatively connected to the modulator 405 and a fiber optic cable 420 that forms at least part of the backend communication channel 125. The fiber optic transmitter 415 is configured to transmit to the second communication node 216 one or more message tables and/or other information, such as a duplicate copy of the message transmitted by the radio transmitter 410, via the backend communication channel 125.

The second communication node 216 in FIG. 4 includes a demodulator 425, a radio receiver 430, and a fiber optic receiver 435. The demodulator 425 includes one or more processors and memory along with other electronics, software, and/or firmware configured to demodulate the message and/or other information from the first communication node 212 using the above-mentioned technique which will be further described below. The radio receiver 430 is operatively connected to the demodulator 425 so as to receive the message and/or other data from the first communication node 212 via the receiving antenna 232. In the illustrated example, the radio receiver 430 again receives the message and/or other data via the primary communication channel 120. The fiber optic receiver 435 is operatively connected to the demodulator 425 and the fiber optic cable 420. The fiber optic receiver 435 is configured to receive from the fiber optic transmitter 415 of the first communication node 212 the message tables and/or other information, such as a duplicate copy of the message from the modulator 405.

It should be recognized that the communication system 200 in FIG. 4 can facilitate one-way communication or two-way communication. For example, the modulator 405 can be configured to act as a modulator-demodulator (modem), and the demodulator 425 can likewise be a modem. The HF radio transmitter 410 in certain variations can be configured to receive wireless communications so as to act as a wireless transceiver. Similarly, the HF radio receiver 430 can also be a wireless transceiver. Both the fiber optic transmitter 415 and fiber optic receiver 435 can be fiber optic transceivers to facilitate two-way communication.

Figure 5:
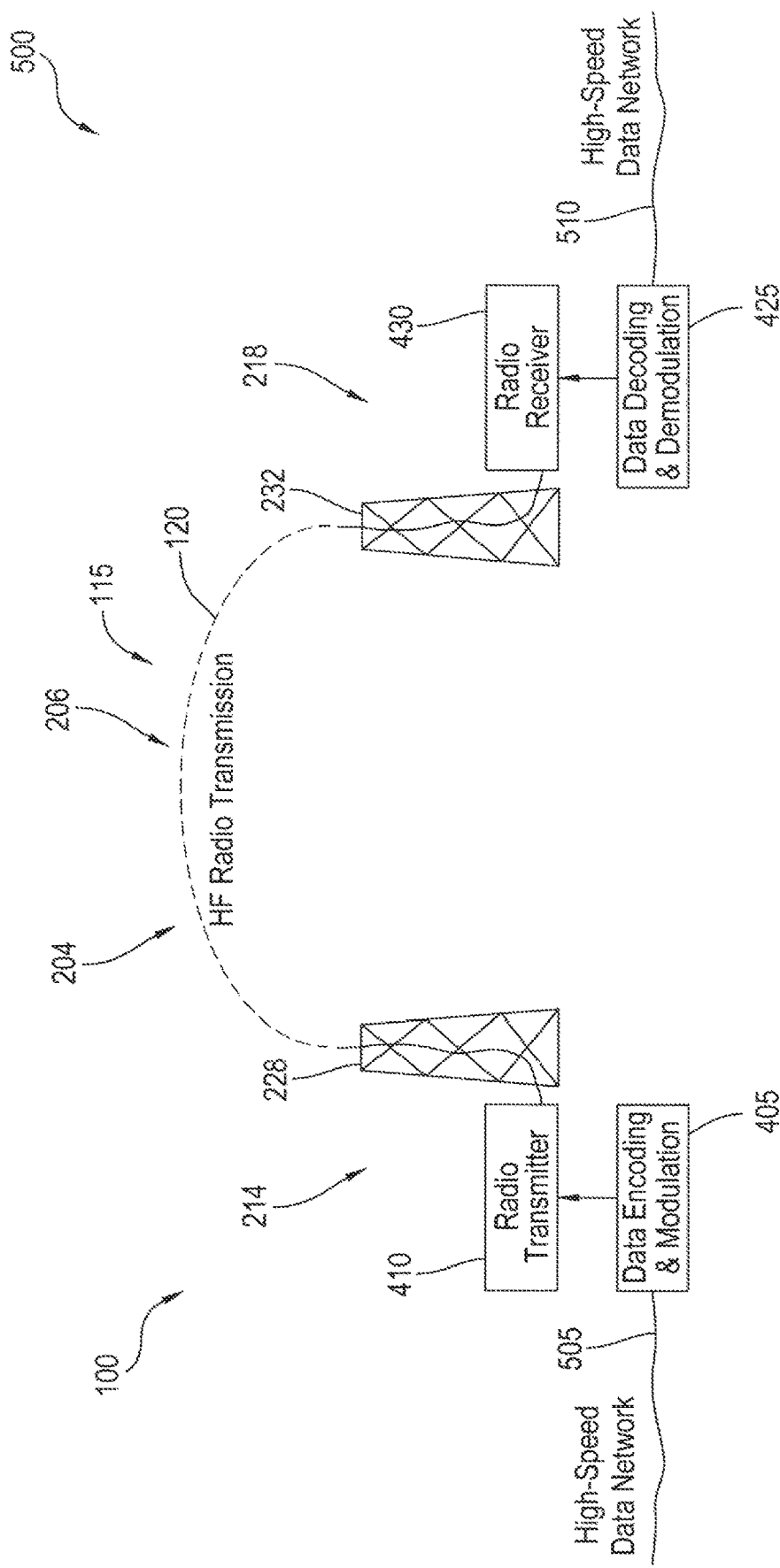
FIG. 5 is a diagrammatic view of a communication system according to a further example.

FIG. 5 shows another variation of the communication system 100 in FIG. 1 that can perform the gear shifting technique described herein. As can be seen, a communication system 500 in FIG. 5 is constructed in a similar fashion and shares a number of components in common with the communication system 200 of FIGS. 2, 3, and 4. For instance, the communication system 500 includes the modulator 405 and the radio transmitter 410 with the transmitting antenna 228 at the transmission station 214 of the type described before. Moreover, the communication system 500 includes the demodulator 425 and the radio receiver 430 with the receiving antenna 232 at the receiving station 218 of the kind mentioned above. As can be seen, however, the fiber optic transmitter 415, fiber optic cable 420, and fiber optic receiver 435 have been eliminated such that all communications are wireless, and more particularly, through skywave communication via the HF radio channel 206. In one variation, the communication system 500 includes a single communication channel 115 in the form of the low latency, low bandwidth communication link 204 that forms the primary communication channel 120. In another variation, the radio communication between the radio transmitter 410 and radio receiver 430 is through two or more HF communication channels 115 such that one forms the primary communication channel 120 and the other forms the backend communication channel 125. In one version, the primary communication channel 120 and the backend communication channel 125 can have generally the same data bandwidth and/or latency, and in other versions, the primary communication channel 120 and backend communication channel 125 can have different data bandwidths and/or latencies. The modulator 405 in the illustrated example is connected to the client 260 through a high speed transmitter data network 505. The demodulator 425 is connected to the instruction processor 268 through a high speed receiver data network 510. In one form, the high speed transmitter data network 505 and high speed receiver data network 510 are high speed data networks.

Figure 6:
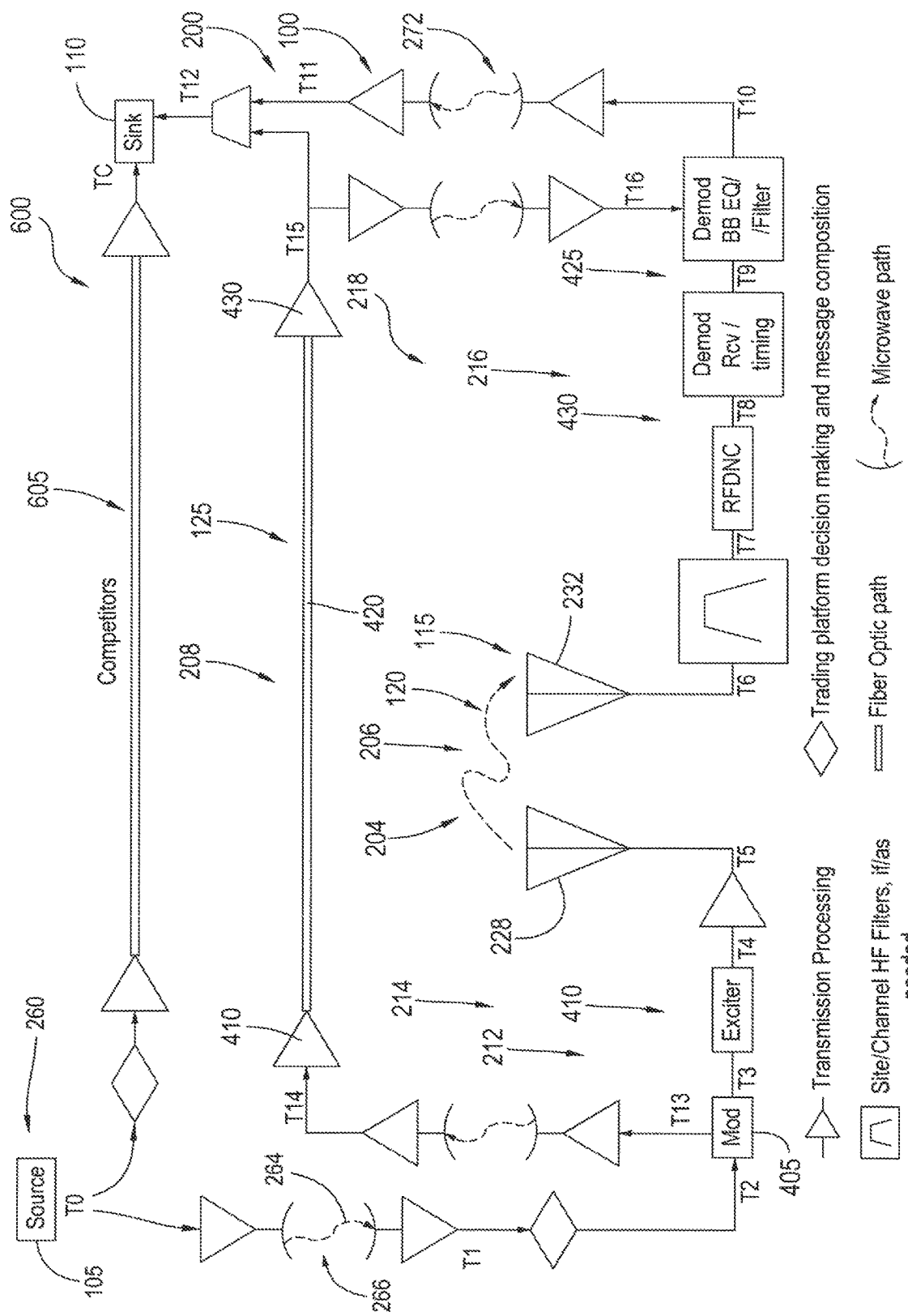
FIG. 6 is a diagrammatic view of a system delay model.

FIG. 6 shows a system delay model 600 for the communication system 200 shown in FIGS. 2, 3, and 4 along with one or more competitor networks 605. The competitor networks 605 include one or more high-speed fiber optic networks, but the competitor networks 605 can include other types of high latency networks. It should be recognized that a similar system delay model 600 can apply to the FIG. 5 communication system 500. For the sake of brevity as well as clarity, the system delay model 600 and subsequent methods will be described with reference to the FIG. 2 communication system 200, but it should be recognized that the system delay model 600 and methods can be used for the FIG. 5 communication system 500. Moreover, the system delay model 600 and subsequent method will be described with reference to a single FIG. 2 communication system 200, but it should be recognized that these methods and model systems can be adapted to handle multiple communication systems 200. Likewise, the system delay model 600 and subsequent method will be described with reference to a single FIG. 6 competitor network 605, but it should be recognized that these methods and model systems can be adapted to handle multiple competitor networks 605. Once more this method of switching equalizers or gears in the communication system 200 will be described with performing transactions of financial instruments (e.g., buying or selling stocks), but it should be recognized that this technique can be adapted for use in other environments such as load balancing remotely located server farms.

In FIG. 6, various time measurement points or periods are in the system delay model 600 are identified by the letter "T" followed by a number. For example, time measurement point T0 represents the time when a message, instruction, command, and/or other data is sent by the client 260 at the information source 105. As another example, time measurement point TC (or arrival time for the competitor) in FIG. 6 represents the transmission or travel time the message takes from the client 260 at the information source 105 to the information destination 110 over the competitor network 605. For financial transactions, TC in the FIG. 6 system delay model 600 is the arrival time at the trading network. This TC time may not be known exactly, but the TC time may be estimated based on known fiber services and/or in other manners such as observing trading behavior of an institution using the competitor network 605.

From the perspective of the FIG. 2 communication system 200, time T9 represents the time the message takes to travel over the HF radio channel 206 (i.e., the low latency, low bandwidth communication link 204) from the information source 105 to the demodulator 425 where the message is demodulated and packaged for transmission from the receiving station 218. Time period T16 represents the time the message takes to travel over the fiber optic cable 420 (i.e., the high latency, high bandwidth communication link 208) from the information source 105 to the demodulator 425 where the message is demodulated and packaged for transmission from the receiving station 218. For the FIG. 2 communication system 200, the delay advantage between the path for the Over-The-Air (OTA) or HF radio channel 206 and the fiber path of the fiber optic cable 420 is the difference between point T16 and T9 (i.e., T16−T9). Time measurement point T10 signifies the time where the packaged message is outputted or communicated from the demodulator 425 to the connection 272. For the overall communication system 200, time measurement point T12 in FIG. 6 represents the transmission or travel time the message takes from the client 260 to the information destination 110 over the competitor network 605. The transmission time T16 over the fiber optic cable 420 of the FIG. 2 communication system 200 can at times lag or lead the arrival time of the competitor TC. However, the transmission time over the competitor network 605 normally will lag (i.e., be slower) as compared to the HF radio channel 206 that uses skywave communication. Due to the OTA time-of-flight advantage of the HF radio channel 206 over fiber-optic cables, the need to purchase the very fastest fiber paths between the trading centers is reduced.

The usable trading effective advantage between the competitor network 605 and the FIG. 2 communication system 200 is TC-T12. In order that the demodulator 425 at the receiving station 218 adapts properly to changing channel conditions, the demodulator 425 needs to know and/or estimate a few of these times in order achieve a sufficient gear shifting strategy to be financially viable. One time parameter is that the receiving station 218 needs to know is at least the T16-TC time difference: Again, the arrival time TC for the competitor may not be known exactly, but TC can be estimated by monitoring or considering one or more factors such as the trading history of the competitor. The operator of the FIG. 2 communication system 200 normally should be able to measure or determine the travel time T16 across the fiber optic cable 420 with a high degree of accuracy. Another parameter is T10-T12, or the time between the output of the demodulator 425 and message entry into the financial trading system which corresponds to the information destination 110 in FIG. 6. This T10-T12 time parameter can be measured during commissioning of the FIG. communication system 200.

Still yet another parameter concerns the processing time within the receiving station 218, and more particularly, the time parameter concerns processing within the modem or demodulator 425. Time parameter T16-T10 (or T9-T10) generally represents the processing time within the modem or demodulator 425 for equalization, errors correction, and message decoding. The time parameter T16-T10 minimum (i.e., T16-T10min) is a minimum target that is set so that a delay advantage between the competitor network 605 and the FIG. 2 communication system 200 (TC-T12) is greater than a minimum delay advantage required for profitable trading. The time parameter T16-T10 maximum (T16-T10max), while not strictly a maximum value for profitability, indicates that the FIG. 2 communication system 200 has reached a point of diminishing returns with respect to delay advantage between the systems TC-T12 where more delay in the demodulator 425 or modem can be tolerated in order to decode more complex modulation techniques.

In addition to the trading strategies being employed, a number of technical factors affect the trading profitability of the FIG. 2 communication system 200. It should be appreciated that the time delays between the FIG. 2 communication system 200 and the competitor networks 605 impact profitability such as during high-speed financial transactions. The larger time advantage of the FIG. 2 communication system 200 over the competitor networks 605 results in higher potential profits, especially when aggregated over multiple financial transactions. The trading network where the financial transactions take place (e.g., a stock or commodity exchange) has a certain amount of processing jitter in the order of when transactions are processed. If the timing advantage (TC-T12) between the competitor network 605 and the communication system 200 is small relative to the trading system jitter, then the value of the advantage drops because a message from point TC may be executed before one from point T12 some fraction of the time, even when the message at T12 arrived first.

Messages errors, such as the number of messages received correctly, can also impact profitability. Sometimes a message cannot be decoded properly and/or the error correction technique is not capable of reliably correcting the message within the time advantage window (or ever). This leads to message erasure in which the transmitted message is deleted and/or never decoded properly at the receiving station 218. It should be appreciated that message erasures can detrimentally impact profitability of the HF radio channel 206 using the FIG. 2 communication system 200 or other communication systems 100 (e.g., the FIG. 5 communication system 500). The number of errored messages delivered to the trading system further impacts client profitability which in turn impacts the potential profitability of the communication system 200. These errored messages occur when the demodulator 425 incorrectly decodes something that is not a message, such as radio noise and/or message fill data, as a valid message.

In the aggregate, timing advantages and system performance affect the economic value of the FIG. 2 communication system 200. For instance, the timing advantage (TC-T12), the number of messages transmitted, and message error rates are some of the factors that impact profitability. These factors can offset one another. For example, the value of a successful message may decrease as the system timing advantage (TC-T12) decreases. This effect is exacerbated by the trading system jitter.

Figure 7:
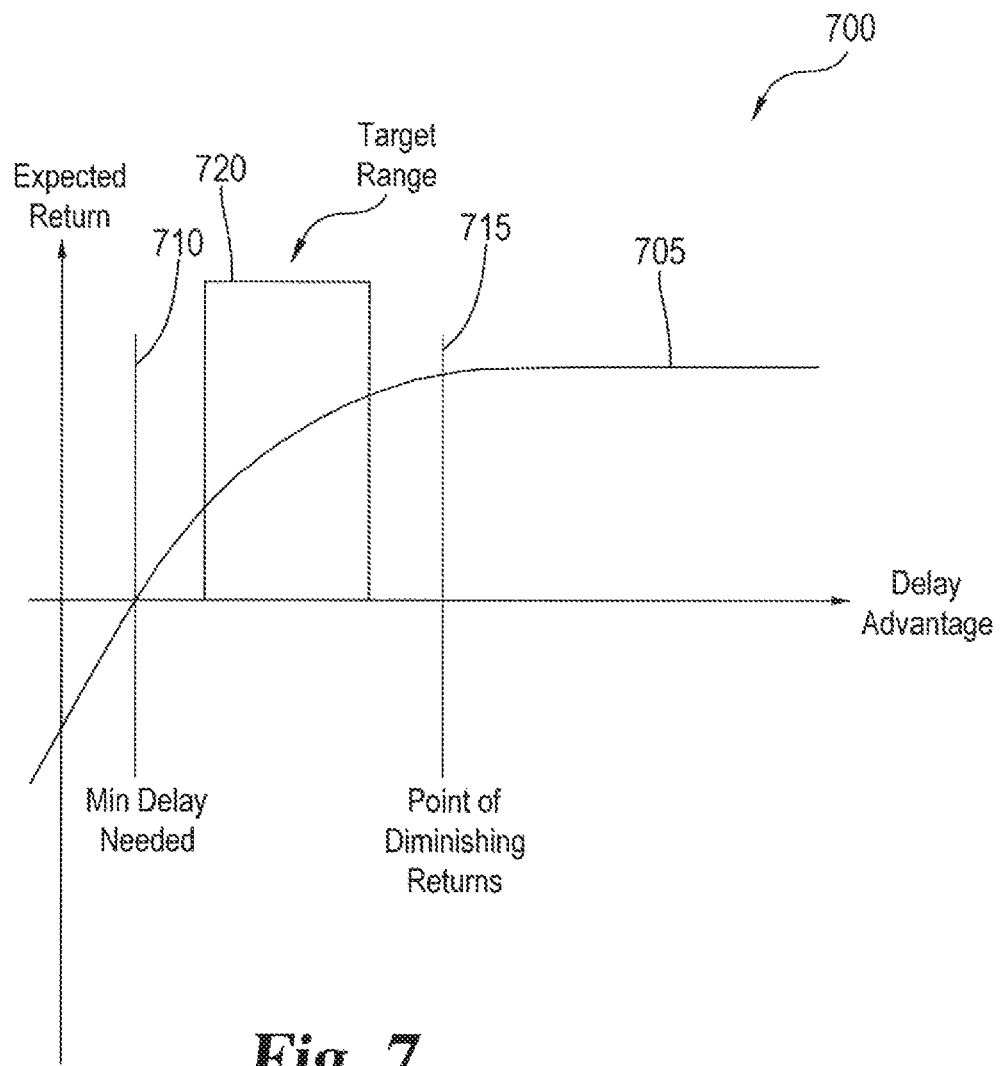
FIG. 7 is a graph of a delay advantage as compared to an expected rate of return.

Looking at a graph 700 in FIG. 7, the concept of diminishing returns also applies resulting in a reduced increase in value per unit of time advantage as the absolute advantage grows. As shown by an expected return line 705 in the graph 700, there is a minimum delay advantage point 710 where the timing advantage (TC-T12) of the FIG. 2 communication system 200 will result in profitability from a statistical perspective (e.g., on average). Among other things, the minimum delay advantage point 710 provides a tolerance or safety margin to account for financial trading system jitter. However, there is also a point of diminishing returns 715 where having the FIG. 2 communication system 200 being even faster than the competitor network 605 only minimally impacts the expected return, or even not at all. Between the minimum delay advantage point 710 and point of diminishing returns 715, there is a target range 720 where the communication system 100 should normally operate to ensure profitability.

In addition to timing advantage, the transmission performance of the communication system 100 affects the economic value of the communication system 100. Simply put, more messages being delivered by the FIG. 2 communication system 200 results in more profit potential. Radio and other transmissions are not perfect. The messages decoded at the receiving station 218 can be correct, erased, or an error (i.e., a false positive message). Each message type has an expected value with errored messages having a negative expected value (a loss). Erased messages can have either a neutral value (no gain or loss) or represent a loss due a missed trade or opportunity that needed to be executed. This relationship can be represented by Equation 1 below.

$$R_{EV} = N_{Succ} * E(\text{Succ}) - N_{Erased} * E(\text{Erased}) - N_{Error} * E(\text{Error})$$

(Equation 1)

where: $R_{EV}$=expected return value for the system $N_{Succ}$=number of messages successfully received E (Succ)=expected value per successful message $N_{Erased}$=number of messages erased because the messages could not be decoded correctly E (Erased)=expected value per erased message $N_{Error}$ is the number of messages in error were decoded incorrectly E (Error)=expected value per errored message During normal operation, the communication system 100 aims to keep the number of successfully received messages ($N_{Succ}$) much greater than the number of erased ($N_{Erased}$) and message errors ($N_{Error}$). This allow the control heuristics for the communication system 100 to focus on the number of successful messages received and the timing advantage of the communication system 100.

One of the areas of the FIG. 2 communication system 200 that is designed or configured to address the timing advantage, message erasure, and message error issues is the demodulator 425 at the receiving station 218. For example, the message length, modulation technique, error coding overhead/technique, and equalizer delay (T10–T9) among other things affect the time delay over the skywave communication system 200 to the output of the demodulator 425 (T10–T0).

To help simplify the explanation, the message length for this example is constant, but in practice, the message length can vary based on channel capacity or other factors. In the receiving station 218, modulation and coding are considered in tandem as together they determine the capacity of a radio channel for a given symbol rate. In FIG. 8, Table 1 800 shows an example of message, modulation, and coding combinations for the communication system 200. Other modes of operation are supported, but Table 1 800 provides an illustrative example.

Looking at the column for packets/second 805 in Table 1 800, it can be appreciated that the potential message capacity of the communication system 200 can vary with the modes selected. The reason that the higher performance modes cannot always be used is caused by the varying nature of the radio channel. Some dominant radio impairments considered include path loss where the lossier channels reduce channel capacity. The HF radio channel 206 also introduces noise directly into the radio path. Both excess loss and more radio-channel noise results in lower signal-to-noise ratios. For a digital system, the energy per bit received divided by the noise density (Eb/No) is often considered.

Besides varying loss behavior, HF radio channels 206 have large amounts of inter-symbol interference due to multiple radio paths through the atmosphere, frequency dependent distortion, and Doppler shift. To combat the noise related effects, the communication system 200 sometime reduces the modulation complexity in order to increase the energy per bit to noise density ratio (Eb/No). To combat the radio channel non-linearities causing inter-symbol interference, the receiving station 218 uses one or more equalizers. However, it was found that equalizers add delays to the received signal. If the processing time in the equalizer (i.e., equalizer length) is too long, the delay advantage of the skywave communication system 200 (TC–T12) may become less than the required minimum delay advantage point 710 ($T_{MIN}$) such that using the skywave communication system 200 will likely not be profitable. In such a case, the receiving station 218 of the communication system 200 uses a shorter equalizer that has less delay and with a more robust (but lower throughput) operating mode. In other words, the FIG. 2 communication system 200 shifts gears between operating modes as the HF radio channel 206 changes.

In one example, the skywave communication system 200 includes a modem adaption system that controls a number of parameters. These parameters for example include modulation formats, error correction techniques/overhead, message size, OTA data collection period, and choice of reference point for an equalization. The OTA data collection period includes both message serialization time and time to collect some (or most) of the multipath energy. The choice of reference point for equalization parameter is used in cases where the signal with the highest power might not be the first one received (see e.g., FIG. 10).

In FIG. 8, Table 1 800 shows an example set of modulation, message lengths and forward error correction (FEC) options used in the skywave communication system 200 of FIG. 2. As will be explained in further detail below, the data represented by Table 1 800 is used by the skywave communication system 200 during the gear shifting method. As can be seen, Table 1 800 includes one or more mode identifiers 810 that identify a specific mode 815 of operation that the communication system 200 should use when communicating over the HF radio channel 206. In the illustrated example, the mode identifiers 810 are in the form of a number, but other types of symbols can be used to identify the mode 815 in other examples. Among other things, each mode 815 in the illustrated example has a specific modulation method 820, FEC scheme 825, cyclic redundancy check (CRC) 830 scheme, user payload size 835, total payload size 840, encoded bit size 845, payload symbol 850, packet length 855, and data rate 860. While modulation method 820 shown in Table 1 800 includes only quadrature amplitude modulation (QAM), it should be appreciated that other types and/or combinations of modulation/demodulation techniques can be used such as amplitude modulation (AM), frequency modulation (FM), and phase modulation (PM) techniques, to name just a few.

As can be seen, the modes 815 are generally organized or sorted based on the packets/second 805 or data rate 860. In other words, the modes 815 with higher numbers for the mode identifiers 810 have higher order QAM constellations. In the illustrated example, the modes 815 have a slower data rate 860 (or packets/second 805) with a lower mode identifier 810 number as compared to the modes 815 have higher data rates 860. It should be appreciated that the exact mode numbers for the mode identifiers 810 can be flipped or reversed in other examples. While moving to higher order modulation schemes with the modes 815 increases the data rate 860, there is a reduced noise immunity and reduced inter-symbol interference (ISI) immunity such that there is a higher risk for error. As will be explained in greater detail below, the skywave communication system 200 tests and shifts between these modes 815 to achieve a more financially and/or performance optimal communication scheme.

Other message lengths and coding schemes can be used in other examples. It should be recognized that increasing the number of bits per symbol decreases message transit time. Increasing the number of bits per symbol in turn increases the number of offered messages and also increases the system timing advantage or delay advantage of the skywave communication system 200 (TC–T12). With these two favorable characteristics of potentially more value per message (i.e., due to time advantage) and more messages in a given period of time, the communication system 200 is designed to run as fast as possible. However, the speed of the skywave communication system 200 is limited up to where message reliability degrades to a point that the expected value ($R_{EV}$) of the communication system 200 begins to decrease.

Figure 9:
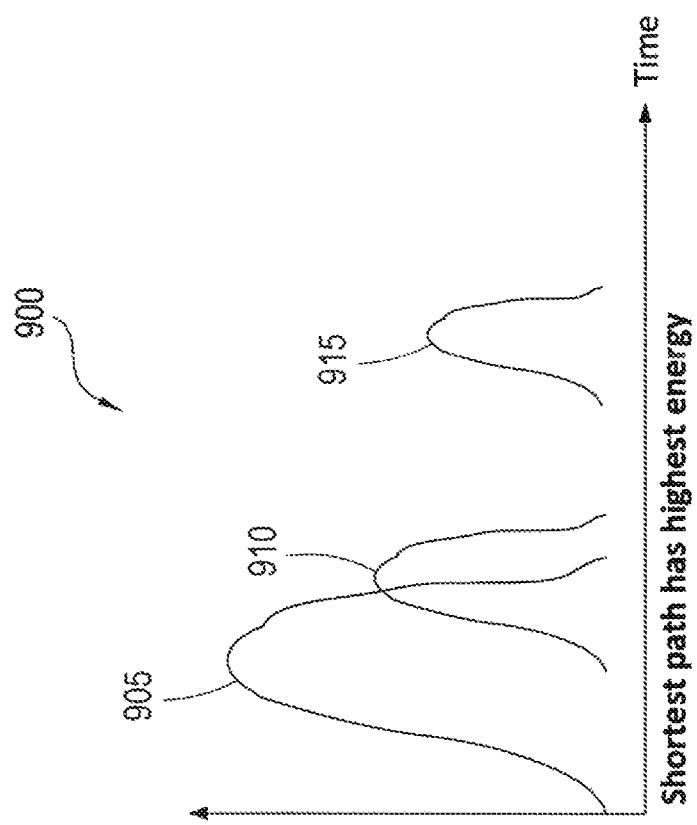
FIG. 9 is a graph of message path profiles where the shortest path has the highest energy.

FIG. 9 includes a graph 900 showing signal power along a short transmission path 905, a medium transition path 910, and a long transmission path 915 in which the short transmission path 905 has the highest energy. The FIG. 9 graph 900 shows a decreasing monotonic function where the delay profile tends to have less energy in the echoes than the main energy lobe. While this does occur, it is not always the case. FIG. 9 includes a graph 1000 showing signal power along a short transmission path 1005, a medium transition path 1010, and a long transmission path 1015 in which the medium transition path 1010 has the highest energy. In this scenario of the FIG. 10 graph 1000, the peak signal power comes after some initial signal power. An issue arises as to whether the receiving station 218 should (1) attempt to equalize on the first energy peak, or (2) wait and use the larger, but later, energy peak. During operation, the communication system 200 considers both of these options.

Figure 11:
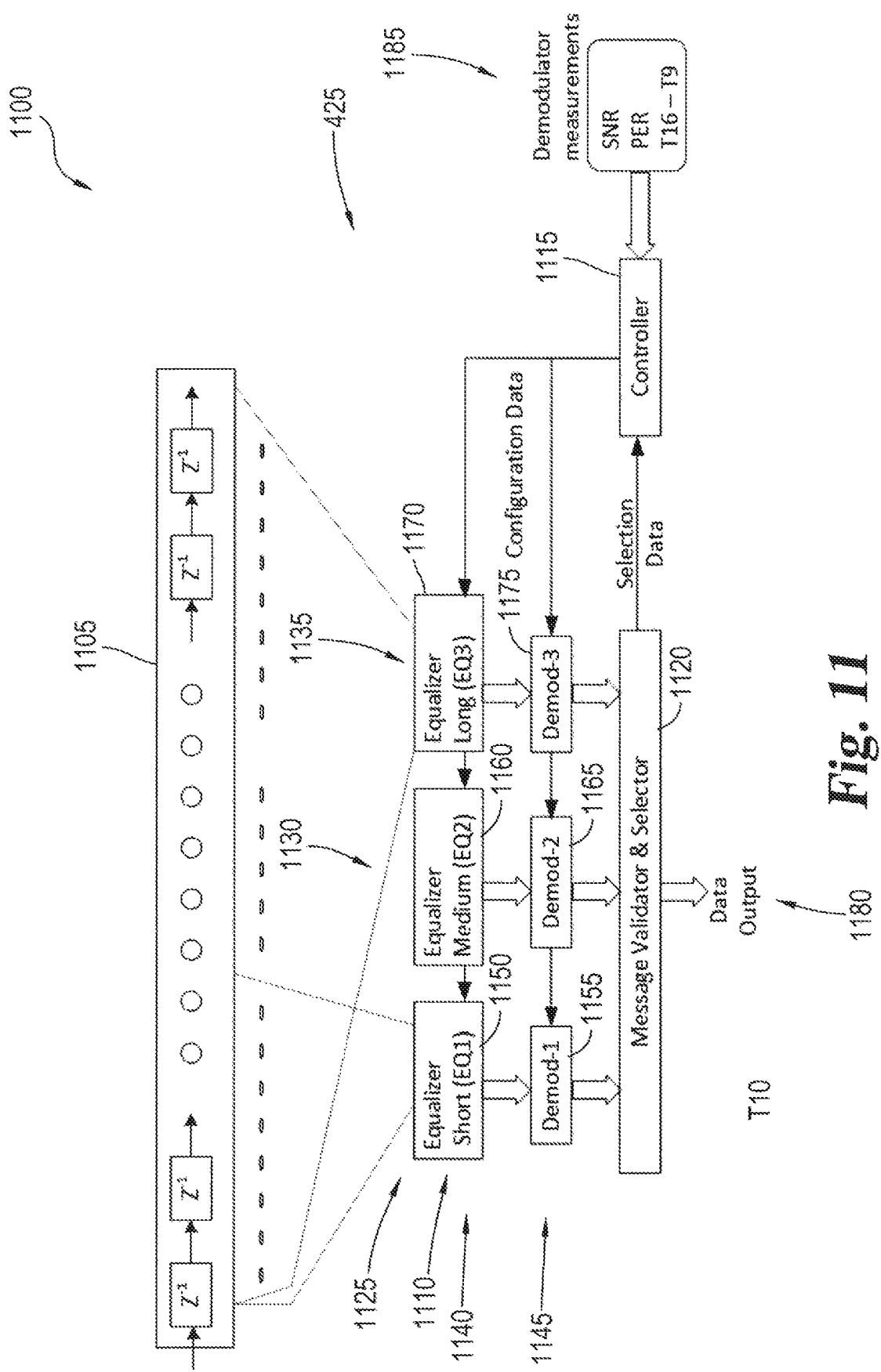
FIG. 11 is a diagrammatic view of a demodulator-equalizer system.

One example of a demodulator-equalizer system 1100 that is configured to switch between one or more operational for equalizing and decoding a data stream 1105 from the low latency, low bandwidth communication link 204, such as the HF radio channel 206, is illustrated in FIG. 11. In one example, the data stream 1105 includes one or more signals that were received through skywave propagation over the HF radio channel 206. The information destination 110 in one version is fully or partially incorporated into the demodulator 425 found in the communication systems 100 of FIGS. 2, 3, 4, 5, and 6, but it should be recognized that the demodulator-equalizer system 1100 can be incorporated into other communication systems 100. While the demodulator-equalizer system 1100 will be described as operating on the demodulator 425 for processing the incoming data stream 1105, it should be recognized that the demodulator 425 can be incorporated in a modulator-demodulator (modem) to facilitate two-way communication. The demodulator-equalizer system 1100 can be configured as hardware, firmware, and/or software on the demodulator 425 or a general purpose computer. In one version, the demodulator-equalizer system 1100 is in the form of software that runs via a processor and memory on the demodulator 425. In another version, the demodulator-equalizer system 1100 is implemented using electronic hardware.

As can be seen, the demodulator-equalizer system 1100 includes two or more demodulator-equalizer units 1110 that are configured to analyze and decode the data stream 1105, a controller 1115 that controls the operation of the demodulator-equalizer units 1110, and a message validator and selector unit 1120 configured to validate and select messages decoded by the demodulator-equalizer units 1110. As shown, the demodulator-equalizer units 1110 are operationally positioned between the data stream 1105 and the message validator and selector unit 1120. Among other things, the demodulator-equalizer units 1110 are configured to equalize and decode the data stream 1105, and if a correct message is decoded (or not), the demodulator-equalizer units 1110 are configured to supply the decoded message to the message validator and selector unit 1120. In the illustrated example, the demodulator-equalizer system 1100 has three (3) demodulator-equalizer units 1110, but in other examples, the demodulator-equalizer system 1100 can have two (2) demodulator-equalizer units 1110 or more than three (3) three demodulator-equalizer units 1110. The demodulator-equalizer units 1110 in the depicted example include a first demodulator-equalizer unit 1125, a second demodulator-equalizer unit 1130, and a third demodulator-equalizer unit 1135. For instance, these three demodulator-equalizer units 1110 in one form can each be assigned or otherwise configured to decode the message of a corresponding message path signal shown FIGS. 9 and 10. By way of example, when the channel resembles FIG. 9, the first demodulator-equalizer unit 1125 in one form is configured to equalize and decode the earliest arriving signal 905 and only part of signal 910. In this same example, the second demodulator-equalizer unit 1130 is configured to equalize signal 905 plus the channel for a time sufficient to capture all of the energy in signal 910, and the third demodulator-equalizer unit 1135 is configured to equalize and decode signal 905, signal 910, and signal 915. By way of a second example in FIG. 10, the first equalizer may capture all of the energy in signal 1005 and none or some of signal 1010, the second equalizer may capture the energy of signal 1010, and the third equalizer may capture the energy of signal 1010 and signal 1015, or the energy of each of signal 1005, signal 110, and signal 1015. While the demodulator-equalizer units 1110 in one case are individual pieces of electric hardware, the demodulator-equalizer units 1110 in other case are separate software processes run on a processor and/or computer. Each of the demodulator-equalizer units 1110 include an equalizer (EQ) 1140 and a demodulator (Demod) 1145. As depicted in FIG. 9, the first demodulator-equalizer unit 1125 includes a first, short equalizer (EQ1) 1150 and a first demodulator (Demod-1) 1155 operatively connected to the first equalizer 1150. The second demodulator-equalizer unit 1130 includes a second, medium equalizer (EQ2) 1160 and a second demodulator (Demod-2) 1165 operatively connected to the second equalizer 1160, and the third demodulator-equalizer unit 1135 includes a third, long equalizer (EQ3) 1170 and a third demodulator (Demod-3) 1175 operatively connected to the third equalizer 1170.

The demodulator-equalizer system 1100 is configured to determine when a mode change is required for the demodulator-equalizer units 1110. In the illustrated example, the three operating demodulators 1145 use the same assigned modulation and coding scheme, but each demodulator-equalizer unit 1110 uses different length equalizers 1140. Generally, the first of the demodulator-equalizer units 1110 to decode the message from the data stream 1105 forward the message to the financial trading system or other system at the information destination 110 via a system output 1180 for the demodulator-equalizer units 1110. In one version, the demodulator-equalizer system 1100 is biased to inhibit false positives by favoring message erasure over the creation of errored messages. In one example, the demodulators 1145 in the demodulator-equalizer units 1110 use an error correction scheme to more likely create message erasures as compared to creating errored messages. This behavior of favoring message erasures is accomplished in one case by limiting the number of bits the forward error correction (FEC) scheme in the demodulators 1145 can correct to less than a maximum number of bits that the FEC scheme can potentially correct.

Similar to a vehicle transmission, the demodulator-equalizer system 1100 is able to shift gears between different equalizer and/or decoding schemes depending on the conditions of the primary communication channel 120 as well as other issues. Depending on the time of day and/or solar activity along with other conditions, for example, different channel frequencies may be more suitable for the HF radio channel 206. By having an equalizer time that is between the first, short equalizer 1150 and the third, long equalizer 1170, the second demodulator-equalizer unit 1130 is normally configured to be the main demodulator-equalizer units 1110 used to decode messages with time delays within the target range 720 (FIG. 7). The first demodulator-equalizer unit 1125 and primary channel latency 135 are designed to test or probe to see if another equalizer and/or demodulator setting would be more appropriate under the current conditions. For example, the dominant message decoder (i.e., second demodulator-equalizer unit 1130) advances in time to the shorter equalizer symbol length of the first, short equalizer 1150 when the first demodulator-equalizer unit 1125 consistently provides a valid message before the calculations are completed on the second demodulator-equalizer unit 1130. Under this condition, the communication channel 115 is becoming more benign or better. In other words, the operational parameters for the second demodulator-equalizer unit 1130 are upshifted to the operational parameters of the first demodulator-equalizer unit 1125 that has the first, short equalizer 1150 with a shorter symbol length or depth such that the messages can be decoded faster. A particular HF radio channel 206 is deemed less favorable to radio communication when the main, second demodulator-equalizer unit 1130 is having more difficulty in correctly decoding the short transmission path 1005 for messages. When this occurs, the second demodulator-equalizer unit 1130 is downshifted to the operational parameters of the third demodulator-equalizer unit 1135 with the third, long equalizer 1170.

With continued reference to FIG. 11, the controller 1115 is operatively connected to the demodulator-equalizer units 1110 to provide configuration data to the equalizers 1140 and demodulators 1145 of the demodulator-equalizer units 1110 to control the operation of the demodulator-equalizer units 1110. The controller 1115 is for example configured to set the symbol depth of each first equalizer 1150. The controller 1115 is further operatively connected to the message validator and selector unit 1120 to receive selection data from the message validator and selector unit 1120. Among other things, the selection data includes the number of messages detected from each equalizer settings in the demodulator-equalizer units 1110. The controller 1115 further has a controller input 1185 where the controller 1115 receives internal information as well as measurements and estimates from the rest of the system delay model 600. For example, the controller 1115 through the controller input 1185 is able to examine estimates of the signal to noise ratio (SNR), packet error rate (PER), and/or the time delay between the high latency, high bandwidth communication link 208 and the HF radio channel 206 (T16–T9 in FIG. 6). Using the required delay and time advantage (TC–T12) performance requirements for the communication system 200, the controller 1115 sets the configuration data for the three demodulator-equalizer units 1110. Through the primary communication channel 120 and/or backend communication channel 125, the controller 1115 communicates to the transmit controller at the transmission station 214 to set the desired current mode of operation. For example, the controller 1115 can communicate to the transmission station 214 the error correction scheme and which HF radio channels 206 to use through the fiber optic cable 420.

As noted before with respect to FIG. 7, the time advantage has an optimum or target range 720. For instance, it makes little sense to have a large number of messages with minimal expected return (i.e., the delay advantage is very small). This situation can occur when the modulation is complex, but the equalizer needs to be very long to correct the channel distortions. Similarly, the operating mode is sub-optimum if there are close to zero (0) message failures in the communication system 200, but the delay advantage has reached the point of diminishing returns 715.

Figure 12:
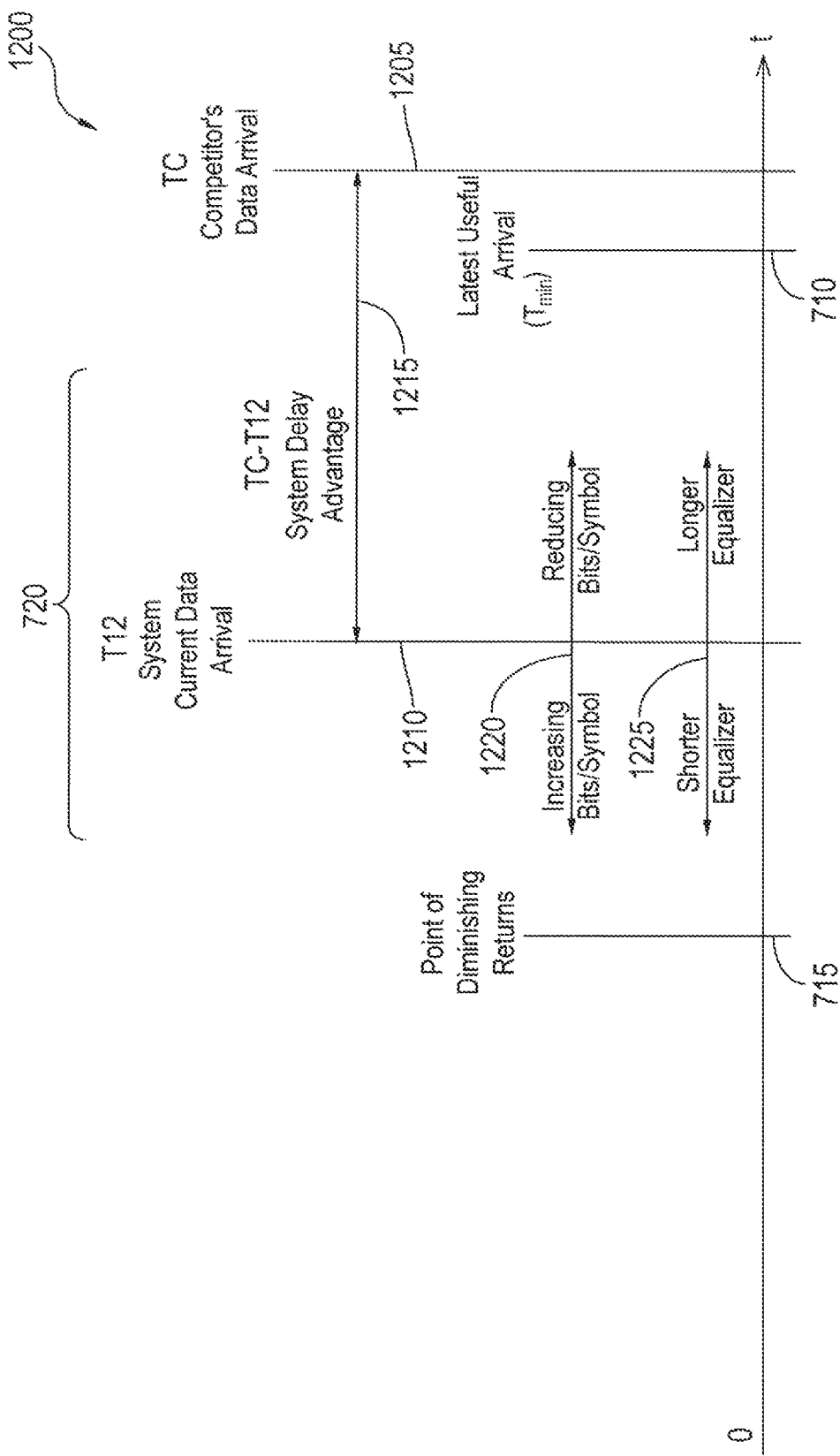
FIG. 12 is a chart of a gear shifting delay environment.

To balance these as well as other concerns, the controller 1115 sets a delay range window or the target range 720, and the controller 1115 of the demodulator-equalizer system 1100 then aims to maximize the number of messages successfully received subject to staying within the target range 720, as is shown by a chart 1200 in FIG. 12. As shown, the chart 1200 shows competitor data arrival time (TC) 1205 and system data arrival time 1210. As can be seen, the time difference between the competitor data arrival time 1205 and primary communication channel 120 creates a system delay advantage 1215. At a minimum, the controller 1115 of the demodulator-equalizer system 1100 attempts to keep the system data arrival time 1210 between the minimum delay advantage point 710 and point of diminishing returns 715, and more preferably, within the target range 720. As indicated by double arrow 1220, adjusting the bits/symbol changes the system delay advantage 1215. For example, reducing the bit/symbol generally increases the length of time required to equalize and decode the message such that the system delay advantage 1215 is reduced, and increasing the number of bits per symbol generally reduces the time, thereby increasing the system data arrival time 1210. In FIG. 12, double arrow 1225 indicates the equalizer length. Generally speaking, longer equalizer windows increase the equalization time to the message which in turn reduces the system delay advantage 1215, and shorter equalization windows reduce the message processing time, thereby increasing the system delay advantage 1215.

Figure 13:
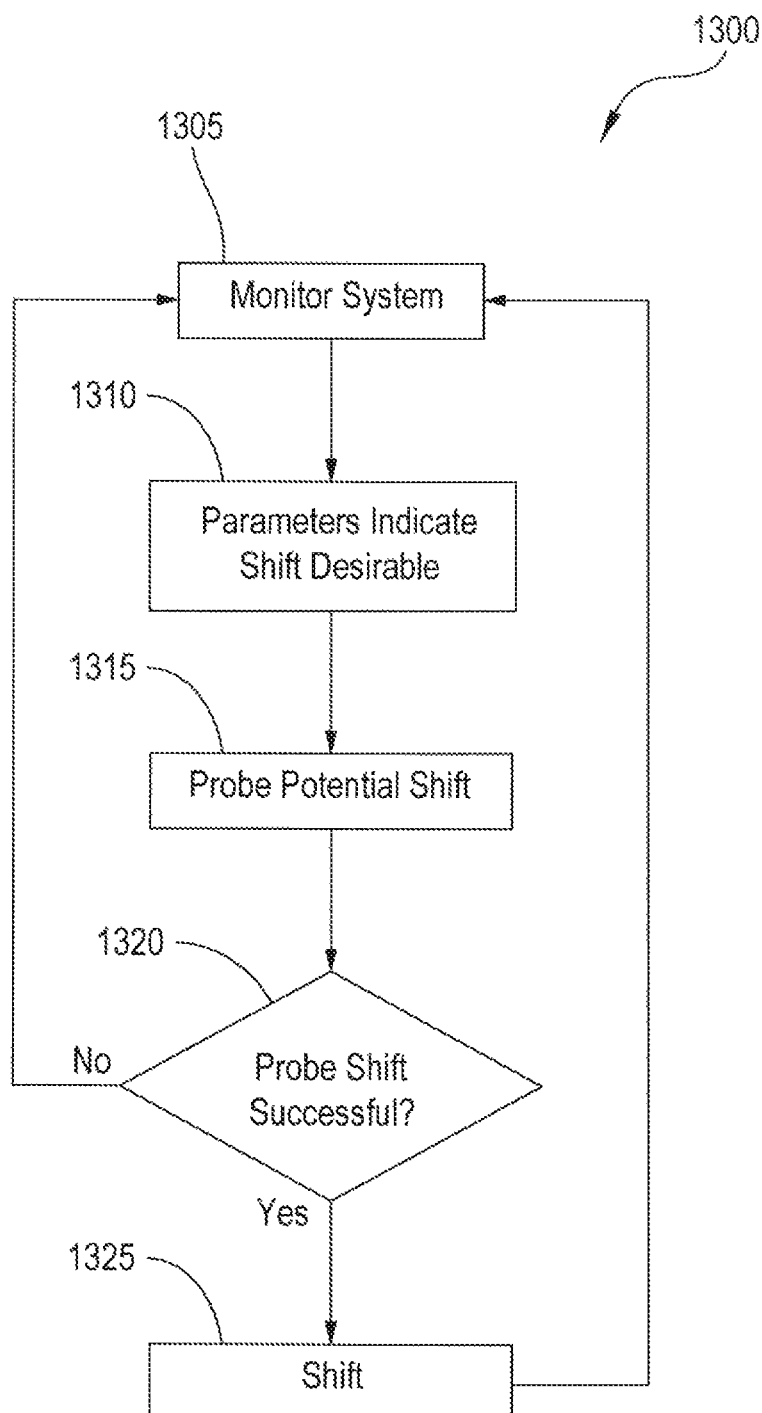
FIG. 13 is a flowchart of a gear shifting technique.

FIG. 13 show a flowchart 1300 that illustrates the overall gear shifting technique used by the demodulator-equalizer system 1100 of the FIG. 2 communication system 200 in FIG. 6. Again, in an ideal situation for financial trading, the communication system 200 should transmit messages as fast as possible, but if the messages are transmitted too fast, the PER increases to the point where no useful information is transmitted. Once the system data arrival time (T12) 1210 (FIG. 12) approaches the point of diminishing returns 715, there is a financial incentive to make more trades in any given time period. To accomplish this, the communication system 200 generally uses a higher rate coding and sends more messages over the same communication channel 115 in which the same number of bits are used with a fewer number of symbols. Looking for example at Table 1 800 in FIG. 8, the 16-QAM scheme for mode 4 and the 512-QAM scheme of mode 9 have the same number of user payload bits (i.e., 64 bits). However, the 512-QAM mode 815 only needs ten (10) payload symbols 850 and has a packet length 855 of 1.3 milliseconds (ms). In contrast, the 16-QAM scheme of mode 4 needs twenty-five (25) payload symbols 850 which results in a longer packet length 855 of 3.1 ms. Comparing mode 9 to mode 4 on a theoretical level, more than twice the number of financial transactions are able to be executed within the same time period using mode 9.

Nevertheless, there is a trade-off of message robustness when transmitting more bits per symbol. As depicted by double arrow 1220 in FIG. 12, reducing the number of bits per symbol makes the message or packet length 855 longer, but the message is more robust such that there is less risk of errors such as when being transmitted over noisy communication channels 115. This longer message length and the resulting longer message time can be sometimes acceptable so long as the system delay advantage 1215 is more than the minimum delay advantage point 710. For example, downshifting the slower 16-QAM scheme of mode 4 may be justified when the system data arrival time 1210 is close to or exceeds the point of diminishing returns 715. These more robust, higher bits per symbol messages typically experience lower inter-symbol interference (ISI). Messages with lower ISI levels usually require shorter processing times by the equalizer 1140 to achieve the same PER. As such, at least some of the system delay advantage 1215 lost by using the more robust lower modes can be offset by the shorter equalizer processing time.

Conversely, increasing the bits per symbol makes the message packet length 855 shorter and faster at the expense of message robustness. The resulting less robust but faster messages may be acceptable when the HF radio channel 206 is generally quiet and not noisy. For example, the demodulator-equalizer system 1100 may switch or shift from modulation-demodulation mode 6 (64-QAM) to mode 7 (128-QAM) under quiet channel conditions or when the system data arrival time 1210 is close to or less than the minimum delay advantage point 710. This upshift in the demodulator mode can also occur when the system data arrival time 1210 is far away from the point of diminishing returns 715 so as to increase expected profitability. These less robust, higher bits per symbol messages are typically more susceptible to ISI levels, as well as requiring higher SNR. Reducing ISI levels can usually be addressed by longer equalizer processing times at the equalizer 1140. From this discussion, it should be recognized that there are trade-offs between the modulation method 820 (or mode 815) and the equalizer processing with respect to the system data arrival time (T12) 1210, message successes, erased messages, and message errors as well as the expected profitability of the communication system 200. The gear or modulation-equalizer shifting technique described herein considers these factors as well as others and accordingly adjusts the modulation-demodulation mode and the equalizer processing time to enhance system profitability under ever changing conditions.

As mentioned before with respect to Table 1 800 in FIG. 8, the FIG. 2 communication system 200 maintains in memory at the transmission station 214 and receiving station 218 a list of different operational modes 815 generally sorted based on the modulation method 820. There is a trade off between the higher data rates 860 provided by the higher order modulation methods 820 and the higher risk of noise and error associated with the higher order modulation methods 820. While more robust FEC scheme 825 at the higher mode identifiers 810 in Table 1 800 can be used to at least compensate for the increased errors, the more robust FEC scheme 825 typically requires a larger overhead which in turn at least partially reduces system delay advantage (TC−T12) 1215 at the decoding stage. In order to simplify the communication model in one example, the same FEC and CRC schemes are used in each packets/second 805 such that the data rate 860 will generally not be impacted. In this case, the modulation method 820 and/or radio frequency or HF radio channel 206 are the parameters that are adjusted when the modes 815 are switched. In another example, the FEC scheme 825 and CRC scheme 830 can change (or not) for each of the modes 815 identified by the mode identifiers 810. These additional variables add complexity to the model which in turn may improve performance of the communication system 200. To help with understanding, the techniques will be described with reference to modes generally having the same FEC and CRC schemes, but it should be recognized that the more complex variable FEC/CRC methods can be used in other examples.

Figure 10:
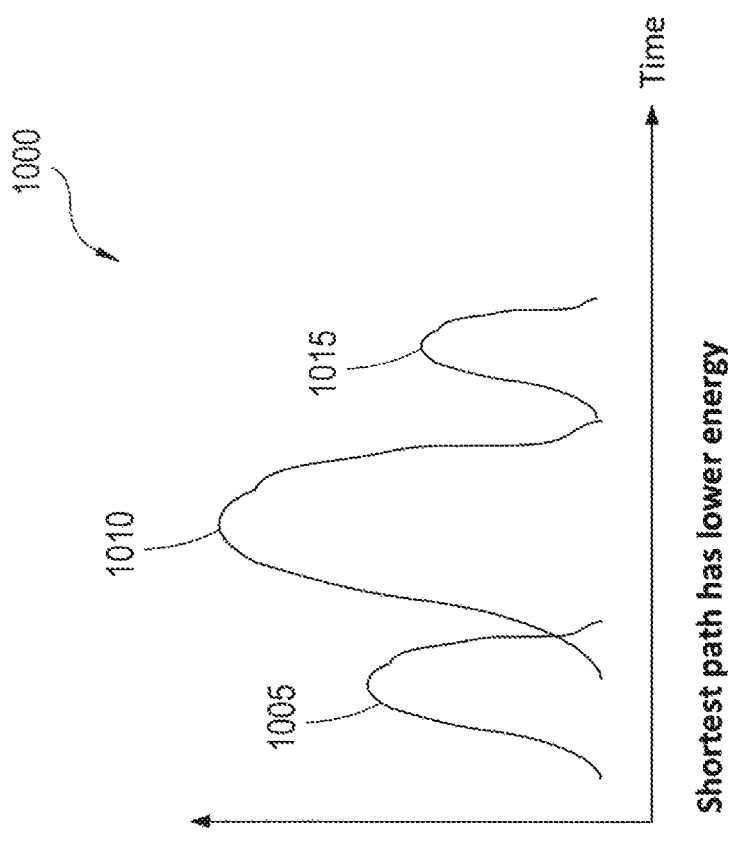
FIG. 10 is a graph of message path profiles where the shortest path has lower energy.

As depicted in FIGS. 9, 10, and 12, there is again a tradeoff based on the length of the equalizer processing time the equalizer 1140 use when receiving a message. When possible, the shorter equalizer window is designed to attempt to demodulate messages received along the short transmission path 905 in FIG. 9 or short transmission path 1005 in FIG. 10. As shown in FIG. 12, the shorter equalizer increases the system delay advantage (TC−T12) 1215. However, as shown by the lower energy short transmission path 1005 in FIG. 10, the shorter path signal may not have sufficient power to be detected by the first equalizer 1150 demodulator 1155 pair. In that case, the longer equalizer windows for the second equalizer 1160 or even the third equalizer 1170 may be needed to detect the message through the higher power medium transition path 1010 from an echo or in combination with all three paths. These longer equalizer processing windows tend to reduce the amount of ISI which in turn reduces the risk of message erasures and message errors. However, the longer equalizer processing windows adversely affect the system delay advantage (TC−T12) 1215. As shown by the double arrow 1225 in FIG. 12, a shorter equalizer window increases the system delay advantage (TC−T12) 1215, and the longer equalizer window reduces the system delay advantage 1215. The gear shifting method illustrated by the flowchart 1300 in FIG. 13 switches or shifts the demodulator-equalizer units 1110 between various mode identifiers 810 and equalizer windows to keep the system data arrival time (T12) 1210 within the target range 720 for optimal transmission and/or financial performance.

To keep the system data arrival time (T12) 1210 within the target range 720, the controller 1115 in stage 1305 monitors various performance factors or parameters, such as the PER, SNR, expected transaction values, system delay advantage (TC−T12) 1215, etc., in the system delay model 600 (FIG. 6). Shifting in one example is considered under three general scenarios or categories. The first scenario occurs when there is one dominant communication path (905 in FIG. 9) on the HF radio channel 206 and there is little ISI. In this first scenario, the signal-to-noise ratio (SNR) of the HF radio channel 206 is the deciding factor of which modulation method 820 to use. If the SNR is improving (i.e., the HF radio channel 206 is becoming more quiet), the controller 1115 may consider performing a test or probe to see if an upshift of the mode 815 (e.g., switch from 64-QAM in mode 6 to 128-QAM in mode 7 in FIG. 8) is a plausible option. On the other hand, when the SNR is degrading such that the HF radio channel 206 is becoming noisier, the controller 1115 may consider performing a probe to see if a downshift of the mode 815 (e.g., switch from 32-QAM in mode 5 to 16-QAM in mode 4) is a plausible option.

In a second scenario, the SNR is ample or otherwise acceptable for all of the modulation methods 820 (e.g., modes 4 to 9 in FIG. 8), but the ISI level is high. As should be appreciated, extending the equalizer processing windows for the equalizer 1140 will help compensate for the increased ISI. Looking at the double arrow 1225 in FIG. 12, the length of the equalizer processing windows can be theoretically increased until the system delay advantage 1215 is just slightly more than (or even equal to) the minimum delay advantage point 710 so as to achieve statistical profitability. As noted before, the competitor data arrival time 1205 on average can be determined, but obtaining real-time competitor arrival data that is accurate may be difficult. It would be expected that the competitor network 605 and the fiber optic cable 420 on the backend communication channel 125 of the FIG. 2 communication system 200 would have similar transmission times.

Under such a scenario, the transmission speed or time on the fiber optic cable 420 on the backend communication channel 125 (T16–T0 in FIG. 6) can be used as a general proxy or substitute for the competitor data arrival time (TC) 1205 on the competitor network 605. It should be recognized that transmission time point T9 for the communication system 200 can be accurately determined by the network operator on a real-time basis. Moreover, the transmission time over the connection 272 (T12–T10) can be accurately determined at the time of commission for the communication system 200 so as to modify the calculations in order to provide a more accurate estimate for T12. In one embodiment, the time advantage ($T_{ADV}$) between the fiber optic cable 420 of the high latency, high bandwidth communication link 208 (T16) and the skywave HF radio channel 206 of the low latency, low bandwidth communication link 204 (T9) at the input of the demodulator 425 (T16–T9) is used as the limit for testing purposes to generally correspond to the competitor data arrival time (TC) 1205. The time advantage ($T_{ADV}$) in some cases can be further modified by some factor or percentage to correspond to act as a buffer for these probe or testing limits. In another example, the time advantage ($T_{ADV}$) is not modified because if the HF radio channel 206 were to be slower than the fiber optic cable 420, there would be generally no need for the calculations because the message would be sent along the faster backend communication channel 125. Other time point limits can be used for probing in other examples.

In the second scenario where there is ample SNR for all modes but ISI is high, when the equalizer processing window extension is possible, and the resultant time advantage ($T_{ADV}$) is greater than the minimum delay advantage point 710 ($T_{MIN}$), then upshift probing is an option. On the other hand, when the equalizer processing window is increased to where the resultant time advantage ($T_{ADV}$) is less than or equal to the minimum delay advantage point 710 ($T_{MIN}$), then downshifting should occur to maintain financial viability of the communication system 200. When downshifting is required, it normally should occur. In contrast, upshifting is more of a matter of conjecture and not always the correct way to proceed. In other words, downshifting is safer than upshifting as the demodulator-equalizer system 1100 can tell that the current situation for downshifting is not operable and needs to change; whereas upshifting is based on a prediction that increasing the modulation level will bring increased message throughput. As such, upshifting is preceded with probing or testing to confirm that the upshifting will work. While not necessary, probing can also be performed during downshifting. The third scenario is some combination of the first and second scenarios. In this third scenario, ISI and SNR are both to some extent limiting the mode of operation for the communication system 200.

When parameters indicate that a shift to a new equalizer processing window size and/or mode is desirable or needed in stage 1310, the controller 1115 via the demodulator-equalizer units 1110 performs a test or probes the potential shift using newer equalizer time windows and/or mode 815 in stage 1315. Under normal operating conditions, the first demodulator-equalizer unit 1125, second demodulator-equalizer unit 1130, and third demodulator-equalizer unit 1135 are operating simultaneously. As noted before, the message validator and selector unit 1120 processes and selects the first message decoded by the demodulator-equalizer units 1110. The second demodulator-equalizer unit 1130 is the nominal case in which most messages should be decoded first by the second demodulator-equalizer unit 1130. Typically, but not always, the controller 1115 uses the first demodulator-equalizer unit 1125 or the third demodulator-equalizer unit 1135 to probe because the first demodulator-equalizer unit 1125 or third demodulator-equalizer unit 1135 are normally operating at the outer operational limits in terms of equalizer processing times and/or demodulation modes. To put it another way, the first equalizer 1150 and third equalizer 1170 are used as edge cases that do not necessarily operate under the limits placed in the second demodulator-equalizer unit 1130 so as to determine operational potential for the demodulator-equalizer system 1100.

Typically, the second demodulator-equalizer unit 1130 operates under the conditions that time advantage ($T_{ADV}$) is greater than or equal to the minimum delay advantage point 710 ($T_{MIN}$) and the time advantage ($T_{ADV}$) is less than or equal to the limit ($T_{DIM}$) for the point of diminishing returns 715 (i.e., $T_{MIN} \leq T_{ADV} \leq T_{DIM}$). In other words, the second demodulator-equalizer unit 1130 is intended to operate within the target range 720. Moving the equalizer window for first equalizer 1150 of the first demodulator-equalizer unit 1125 so that the time advantage ($T_{ADV}$) is greater than the limit ($T_{DIM}$) for the point of diminishing returns 715 (i.e., $T_{ADV} > T_{DIM}$) has no specific penalty, other than the demodulator-equalizer system 1100 may be able to upshift as the current delay spread is lower than the current operating mode demands. Letting third equalizer 1170 of the third demodulator-equalizer unit 1135 exceed the limit where the minimum delay advantage point 710 ($T_{MIN}$) is greater than the time advantage ($T_{ADV}$) (i.e., $T_{MIN} > T_{ADV}$) would mean that the decoded data from the third demodulator-equalizer unit 1135 will arrive too late for profitable operation.

As noted before, the first equalizer 1150 of the first demodulator-equalizer unit 1125 has the shortest equalizer processing window, and the third demodulator-equalizer unit 1135 has the longest equalizer processing time. When controller 1115 determines through the message validator and selector unit 1120 that the first demodulator-equalizer unit 1125 is decoding all or most of the message before the other demodulator-equalizer units 1110, the controller 1115 will initiate a probe in stage 1315 to determine if upshifting is a viable option. The third equalizer 1170 of the third equalizer 1170 is used to determine when a downshift to a more robust modulation method 820 is required.

When conditions indicate that an upshift is desirable, the controller 1115 will use the first, short equalizer 1150 of the first demodulator-equalizer unit 1125 to perform the probing. Usually, the upshift probing occurs when conditions appear to indicate that the HF radio channel 206 is becoming more benign. On the other hand, the particular HF radio channel 206 is deemed less favorable to radio communication (e.g., becomes noisier) when the main, second demodulator-equalizer unit 1130 is having more difficulty in correctly decoding the short transmission path 1005 for messages. When conditions indicate downshifting is advisable or required, the second demodulator-equalizer unit 1130 probes or performs a test with the third demodulator-equalizer unit 1135 to see which lower modulation method 820 is needed to satisfy the performance and/or financial requirements.

During the probing process in stage 1320, a number of tries are attempted in which sample or probe messages are transmitted. Normal financial messages can still be sent during probing. Through the message validator and selector unit 1120, the controller 1115 determines if the equalizer or demodulator settings used during the probe were acceptable. For instance, the controller 1115 can determine the success or failure of the probe test depending on the PER for the sample of messages used in the probe. If the probe in stage 1320 proves to be unsuccessful, the controller 1115 returns to stage 1305 and the cycle begins again. On the other hand, when the probe is successful, the controller 1115 in stage 1325 switches the settings of the second demodulator-equalizer unit 1130 to probe settings, and the settings for the probing demodulator-equalizer units 1110 (i.e., the first demodulator-equalizer unit 1125 or third demodulator-equalizer unit 1135) are correspondingly changed to monitor the outer performance limits. For example, the operational parameters for the second demodulator-equalizer unit 1130 are upshifted to the operational parameters of the first demodulator-equalizer unit 1125. The second demodulator-equalizer unit 1130 can also be downshifted to the operational parameters of the third demodulator-equalizer unit 1135. Once shifting occurs, the controller 1115 returns to stage 1305 to start the process again.

Figure 15:
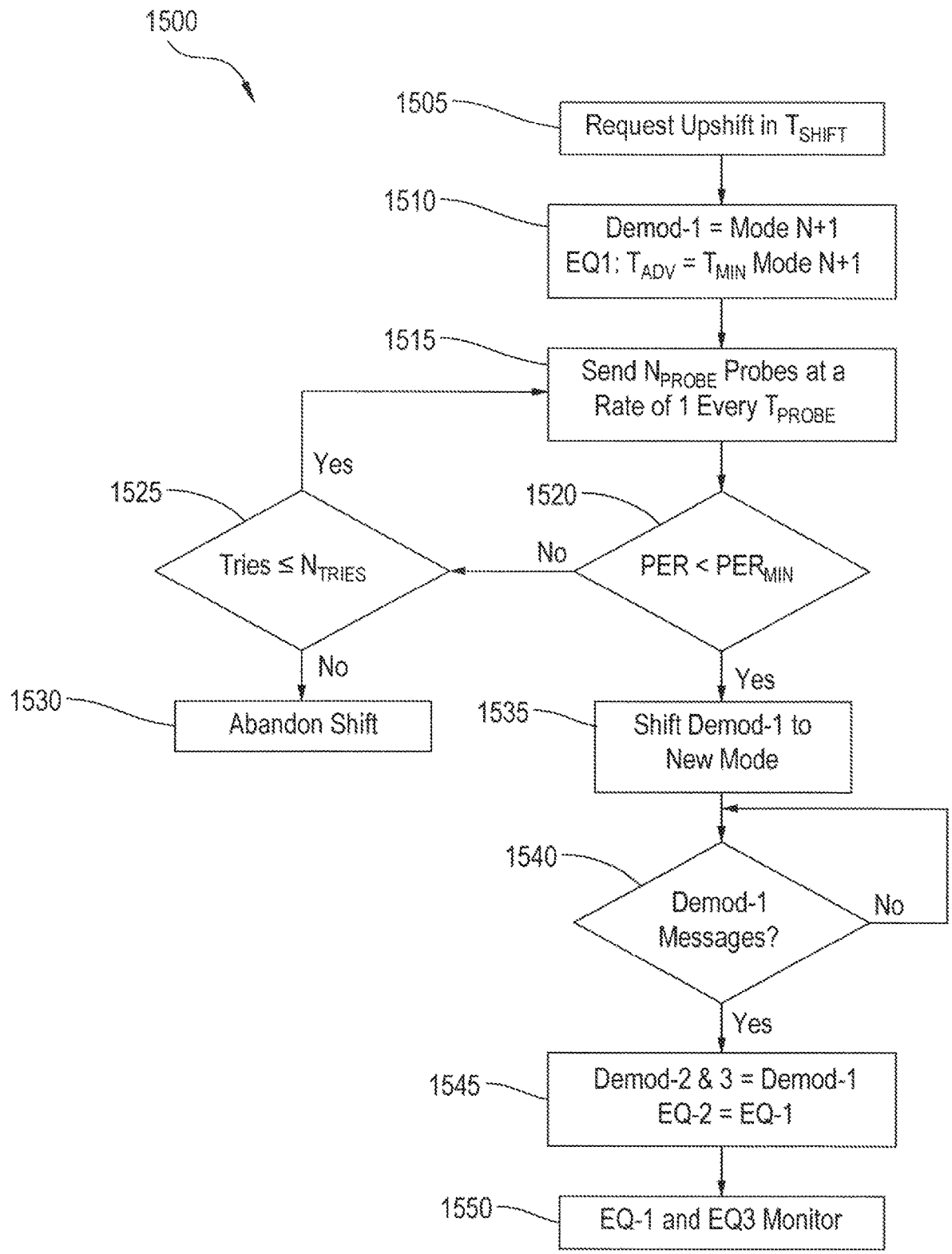
FIG. 15 is a flowchart of an upshifting technique.
Figure 16:
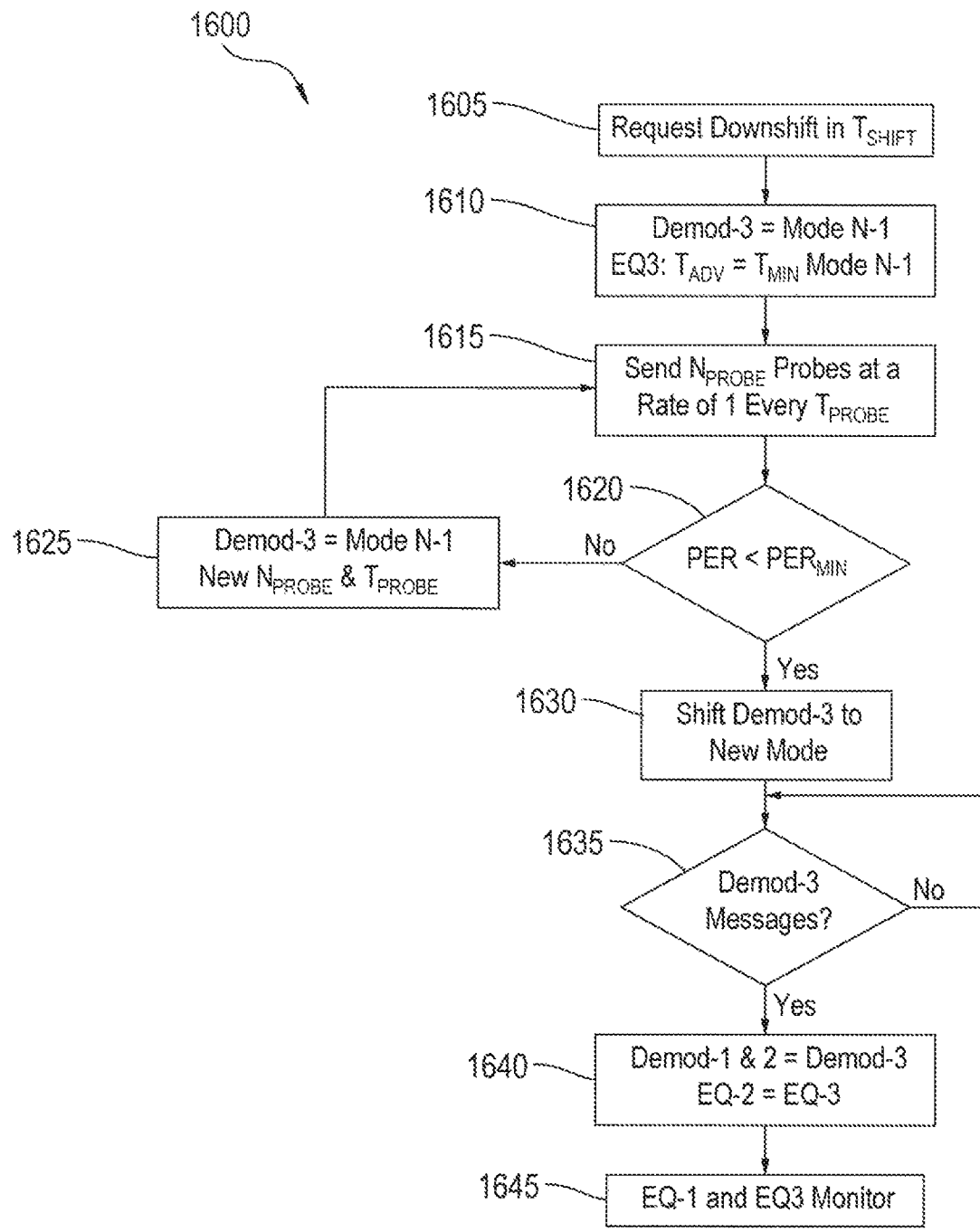
FIG. 16 is a flowchart of a downshifting technique.

FIG. 14 includes a Table 2 1400 that shows some examples of the variables the controller 1115 uses when performing the shifting techniques illustrated in FIGS. 13, 15, and 16. It should be appreciated that other variables can be considered and processed in the controller 1115 using these techniques. The variable ranges and types specified in Table 2 1400 are just some examples, and these ranges and types can be different in other examples. Moreover, other combinations of variables can be considered when performing these shifting techniques.

Again, there is a financial incentive to make more trades in any given time period. To accomplish this, upshifting is used by the communication system 200 to switch to a higher rate coding. Looking for example at Table 1 800 in FIG. 8, the communication system 200 performs an upshift when the communication system 200 switches from the 64-QAM scheme for mode 6 to the 128-QAM scheme of mode 7. When this upshift occurs, the packets/second 805 and data rate 860 increase which in turn can increase the profitability of the communication system 200.

An example of the shifting technique of FIG. 13 is illustrated by a flowchart 1500 in FIG. 15. In particular, the flowchart 1500 shows the acts that the controller 1115 as well as the other components of the demodulator-equalizer system 1100 perform during an upshift event. The controller 1115 can initiate the upshift process based on a number of events or conditions. For example, the controller 1115 can initiate the upshift process when the measured packet error rate (PER) from the system output 1180 or from some of the demodulator-equalizer units 1110 is less than a lower limit such as a packet error rate minimum (PER<$PER_{MIN}$). As alluded to before, the PER may reach a point of diminishing returns in which further decreasing the PER is not financially beneficial or beneficial from an overall system performance perspective. Usually, reducing the PER comes at the expense of the system delay advantage 1215. Alternatively or additionally, upshifting can be initiated when the signal to noise ratio (SNR) trends upwards and/or when the channel estimator or model that the controller 1115 uses indicates the system delay advantage (TC−T12) 1215 is decreasing. Another factor that can be considered alone or in combination with other factors is the first demodulator-equalizer unit 1125 using a delay time such that time advantage as measured at T16−T9 ($T_{ADV}$) is greater than the time or point of diminishing returns 715 ($T_{DIM}$) (i.e., $T_{ADV}>T_{DIM}$ has a PER that is considerably less than the maximum permissible error rate ($PER_{MAX}$) (i.e., PER<<$PER_{MAX}$). To put it another way, upshifting is usually tested when the communication system 200 is too good in that there are no or very few errors under the current demodulation and equalizer settings.

When one or more of the above conditions occur (and/or other conditions), the controller 1115 initiates the upshift process. In stage 1505, the controller 1115 instructs the transmission station 214 to initiate an upshift at a specific upshift time ($T_{SHIFT}$) or within a specific time range. Both transmission station 214 and receiving station 218 maintain data similar to Table 1 800 in FIG. 8 so as to coordinate which modulation mode to use. This modulation information can be updated on a periodic and/or as-needed basis. The instructions can be sent via the primary communication channel 120, like the HF radio channel 206, and/or via the backend communication channel 125 such as the fiber optic cable 420. The controller 1115 in stage 1510 sets the mode 815 to the next highest modulation method 820 (i.e., one modulation mode above the current one). For example, if the initial mode was mode 4 (16-QAM), the controller 1115 will set the first demodulator 1155 to demodulate using mode 5 (32-QAM) in Table 1 800 of FIG. 8. The equalizer processing window for the short, first equalizer 1150 is set so that the window or the time advantage ($T_{ADV}$) is the same as the minimum delay advantage point 710 ($T_{MIN}$) for the new mode (mode N+1). Using the modulation from the new mode, the modulator 405 at the transmission station 214 modulates and transmits over the HF radio channel 206 a number ($N_{PROBE}$) of probe signals at a rate of 1 every probing time period ($T_{PROBE}$ ms) in stage 1515. Returning to the previous example, the probe messages or signals are modulated by the modulator 405 using mode 5 (32-QAM), and the transmission station 214 transmits ten (10) probes spaced out by 30 ms over the HF radio channel 206.

In stage 1520, if first demodulator 1155 probes are unsuccessful in that the PER is at or exceeds a maximum limit (PER≥$PER_{MAX}$), then the controller 1115 determines if the probing has exceeded the number of attempts or tries limit ($N_{TRIES}$) in stage 1525. If not, the controller 1115 instructs the modulator 405 and radio transmitter 410 at the transmission station 214 to continue probing and send new values in stage 1515. When the demodulator-equalizer system 1100 is not successful after the specified number of attempts limit ($N_{TRIES}$) then the upshift is abandoned in stage 1530. On the other hand, if first demodulator 1155 in stage 1520 receives the probes successfully (i.e., PER<$PER_{MIN}$), the controller 1115 in stage 1535 instructs the modulator 405 at the transmission station 214 to change to the new mode. With the previous example, the modulator 405 in stage 1535 is shifted to modulating messages according to mode 5 (32-QAM).

It should be recognized that once this upshift occurs, the second demodulator-equalizer unit 1130 and third demodulator-equalizer unit 1135 will no longer be able to decode the incoming data stream 1105. Once first demodulator 1155 in stage 1540 is receiving the messages, the second demodulator 1165 and third demodulator 1175 are set to the new modulator mode of the first demodulator 1155 in stage 1545. Returning to the previous example, the second demodulator 1165 and third demodulator 1175 are upshifted to demodulate messages now according to mode 5 (32-QAM). The equalizer processing time window for the second equalizer 1160 in stage 1545 is also set to the new equalizer processing time window (or $T_{ADV}$) used by the first equalizer 1150 during the probing. This change makes the second demodulator-equalizer unit 1130 again the nominal decoding set supplying the messages to the message validator and selector unit 1120. In other words, all or most of the decoded messages should now be first decoded by the second demodulator-equalizer unit 1130 and sent to the message validator and selector unit 1120.

In stage 1550, first equalizer 1150 assumes the usual role of shortening the equalizer processing time window to improve the time advantage ($T_{ADV}$) and look for another upshift opportunity. The equalizer processing time for the third equalizer 1170 in stage 1550 is allowed to grow or become larger in order to test or determine the amount of equalization needed for near-error-free reception. This process of the FIG. 15 flowchart 1500 continues again for additional upshift opportunities.

Generally, downshifting occurs when the demodulator-equalizer system 1100 is not able to successfully decode enough messages on average by the minimum delay advantage point 710. Channel noise and other error sources may inhibit the demodulator-equalizer system 1100 from properly decoding the messages in time using the current mode 815. Looking for example at Table 1 800 in FIG. 8, the communication system 200 performs a downshift when the communication system 200 switches from the 64-QAM scheme for mode 6 to the 32-QAM scheme of mode 5.

An example of the shifting technique of FIG. 13 is illustrated by a flowchart 1600 in FIG. 16. In particular, the flowchart 1600 shows the acts that the controller 1115 as well as the other components of the demodulator-equalizer system 1100 perform during a downshift process. The controller 1115 can initiate the downshift process based on a number of events or conditions. For example, the decision to downshift can be based on one or more of the following conditions plus others. For example, downshifting should occur when the measured PER is greater that a maximum packet error rate limit ($PER_{MAX}$). Downshifting can also occur when the measured SNR is trending down for the demodulator-equalizer system 1100. This can further happen when the channel estimation indicates that the delay spread (and hence ISI) is increasing. Downshifting may be advisable when the PER of third demodulator-equalizer unit 1135 is the only one less than the packet error rate limit ($PER_{MAX}$) and third equalizer 1170 is set so that the time advantage ($T_{ADV}$) is less than or equal to the minimum delay advantage point 710 ($T_{MIN}$) for the third demodulator-equalizer unit 1135.

When one or more of the above conditions occur (and/or other conditions), the controller 1115 initiates the downshift process. In stage 1605, the controller 1115 instructs the transmission station 214 to initiate a downshift at a specific upshift time ($T_{SHIFT}$) or within a specific time range. Both transmission station 214 and receiving station 218 maintain data similar to Table 1 800 in FIG. 8 so as to coordinate which modulation mode to used. This modulation information can be updated on a periodic and/or as-needed basis. The instructions can be sent via the primary communication channel 120, like the HF radio channel 206, and/or via the backend communication channel 125 such as the fiber optic cable 420. The controller 1115 in stage 1610 sets the mode 815 to the next lowest modulation method 820 (i.e., one modulation mode below the current one). For example, if the initial mode was mode 6 (64-QAM), the controller 1115 will set the third demodulator 1175 to demodulate using mode 5 (32-QAM) in Table 1 800 of FIG. 8. The equalizer processing window for the long, third equalizer 1170 is set so that the window or the time advantage ($T_{ADV}$) is the same as the minimum delay advantage point 710 ($T_{MIN}$) for the new, lower mode (mode N−1). Using the modulation from the new mode, the modulator 405 at the transmission station 214 modulates and transmits over the HF radio channel 206 a number ($N_{PROBE}$) of probe signals at a rate of 1 every probing time period ($T_{PROBE}$ ms) in stage 1615. Returning to the previous example, the probe messages or signals are modulated by the modulator 405 using mode 5 (32-QAM), and the transmission station 214 transmits ten (10) probes spaced out by 30 ms over the HF radio channel 206.

In stage 1620, if the probes are unsuccessful in that the PER is below a minimum limit (PER<$PER_{MIN}$), then the controller 1115 in stage 1625 downshifts third demodulator 1175 to an even lower demodulation mode (e.g., mode 4, 16-QAM). The controller 1115 instructs the modulator 405 and radio transmitter 410 at the transmission station 214 to continue probing and send new values in stage 1615. When the third demodulator 1175 in stage 1620 receives the probes successfully (i.e., PER≥$PER_{MIN}$), the controller 1115 in stage 1630 instructs the modulator 405 at the transmission station 214 to change to the new lower mode. With the previous example, the modulator 405 in stage 1535 is shifted to modulating messages according to mode 5 (32-QAM) if successful upon the first probe test.

It should be recognized that once this downshift occurs, the first demodulator-equalizer unit 1125 and second demodulator-equalizer unit 1130 will no longer be able to decode the incoming data stream 1105. Once third demodulator 1175 in stage 1635 is receiving the messages, the first demodulator 1155 and second demodulator 1165 are set to the new modulator mode of the third demodulator 1175 in stage 1640. Returning to the previous example, the first demodulator 1155 and second demodulator 1165 are downshifted to demodulate messages now according to mode 5 (32-QAM). The equalizer processing time window for the second equalizer 1160 in stage 1640 is also set to the new equalizer processing time window (or $T_{ADV}$) used by the third equalizer 1170 during the probing. This change makes the second demodulator-equalizer unit 1130 again the nominal decoding set supplying the messages to the message validator and selector unit 1120. In other words, all or most of the decoded messages should now be first decoded by the second demodulator-equalizer unit 1130 and sent to the message validator and selector unit 1120.

In stage 1645, third equalizer 1170 assumes the usual role of extending the equalizer processing time window to improve PER and look for another downshift opportunity. The equalizer processing time for the third equalizer 1170 in stage 1550 is allowed to grow or become larger in order to test or determine the amount of equalization needed for near-error-free reception. The first demodulator-equalizer unit 1125 in contrast continues to search for upshifting opportunities. This process of the FIG. 16 flowchart 1600 continues again for additional upshift opportunities.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization. In the case of radio waves, an antenna may transmit at frequencies ranging along an electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data. Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical, horizontal, or any combination thereof. Antennas may also be configured to radiate electromagnetic energy within a specific range of vertical angles (i.e. "takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies. Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Backend Communication Channel", "Secondary Communication Channel", or "Secondary Channel" generally refers to a communication pathway that is a main choice for transferring information. Typically, but not always, the secondary channel has one or more properties, such as latency or bandwidth, that make the channel less desirable over a primary channel. For example, a secondary channel can have a lower data rate and/or latency as compared to a primary channel. A primary channel may support the transfer of information in one direction only, either direction alternately, or both directions simultaneously. The secondary channel can for example include wired and wireless forms of communication.

"Band" or "Frequency Bandwidth" generally refer to a contiguous range of frequencies defined by an upper and lower frequency. Frequency bandwidth is thus typically expressed as a number of hertz (cycles per second) representing the difference between the upper frequency and the lower frequency of the band and may or may not include the upper and lower frequencies themselves. A "band" can therefore be defined by a given frequency bandwidth for a given region and designated with generally agreed on terms. For example, the "20 meter band" in the United States is assigned the frequency range from 14 MHz to 14.35 MHz thus defining a frequency bandwidth of 0.35 MHz or 350 KHz. In another example, the International Telecommunication Union (ITU) has designated the frequency range from 300 MHz to 3 GHz as the "UHF band".

"Checksum" generally refers to data derived from a block of digital data for the purpose of detecting errors that may have been introduced during its transmission and/or storage. Typically, the checksum data is relatively small-sized. By themselves, checksums are often used to verify data integrity, but checksums are not typically relied upon to verify data authenticity. The procedure or process that generates the checksum from a data input is called a checksum function or checksum algorithm. Depending on the use case, a good checksum algorithm will usually output a significantly different value, even for small changes made to the data input. When the computed checksum for a data input matches the stored value of a previously computed checksum, the probability that the data has not been accidentally altered and/or corrupted is high. Some checksum algorithm techniques include parity byte, sum complement, and position-dependent algorithms. Check digits and parity bits are special cases of checksums that are usually appropriate for small blocks of data. Some error-correcting codes are based on special checksums which not only detect common errors, but the error correcting code in some cases further helps in the recovery of the original data.

"Command" or "Command Data" generally refers to one or more directives, instructions, algorithms, or rules controlling a machine to take one or more actions, alone or in combination. A command may be stored, transferred, transmitted, or otherwise processed in any suitable manner. For example, a command may be stored in a memory or transmitted over a communication network as electromagnetic radiation at any suitable frequency passing through any suitable medium.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Communication Node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Controller" generally refers to a mechanical or electronic device configured to control the behavior of another mechanical or electronic device. A controller may include a "control circuit" configured to provide signals or other electrical impulses that may be received and interpreted by the controlled device to indicate how it should behave.

"Critical angle" generally refers to the highest angle with respect to a vertical line extending to the center of the Earth at which an electromagnetic wave at a specific frequency can be returned to the earth using skywave propagation.

"Critical Frequency" generally refers to the highest frequency that will be returned to the Earth when transmitted vertically under given ionospheric conditions using skywave propagation.

"Cyclic Redundancy Check" or "CRC" generally refers to an error-detecting code or technique to detect errors in digital data. For example, CRC is commonly used in digital networks and/or storage devices to detect accidental changes to raw data. CRC is based on binary division, and CRC is also sometimes referred to as polynomial code checksum. With CRC, blocks of data get encoded with or attached a short check value that is based on the remainder of a polynomial division of the contents of the blocks of data. During retrieval or decoding, the calculation is repeated. When the check values do not match, corrective action can be taken against data corruption. CRCs can be further used to facilitate error correction. The check or data verification value is a redundancy because it expands the message without adding information. CRCs can be simple to implement in binary hardware, easy to analyze mathematically, and are good at detecting common errors caused by noisy transmission channels. Given the check value has a fixed length, the function that generates the check value is sometimes used as a hash function.

"Data Bandwidth" generally refers to the maximum throughput of a logical or physical communication path in a communication system. Data bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the data bandwidth of a given digital communications network. Data networks may be rated according to their data bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz. Data bandwidth may also be characterized according to the maximum transfer rate for a particular communications network. For example:

"Low Data Bandwidth" generally refers to a communications network with a maximum data transfer rate that is less than or about equal to 1,000,000 units of data per second. For example, in a digital communications network, the unit of data is a bit. Therefore low data bandwidth digital communications networks are networks with a maximum transfer rate that is less than or about equal to 1,000,000 bits per second (1 Mbits/s).

"High Data Bandwidth" generally refers to a communications network with a maximum data transfer rate that is greater than about 1,000,000 units of data per second. For example, a digital communications network with a high data bandwidth is a digital communications network with a maximum transfer rate that is greater than about 1,000,000 bits per second (1 Mbits/s).

"Demodulation" generally refers to a process of extracting an original information-bearing signal from a carrier wave.

"Demodulator" or "Detector" generally refers to a device, such as an electronic circuit and/or computer, that extracts original information from a received modulated waveform based on one or more properties of the waveform. For example, these properties of the waveform can include amplitude, frequency, phase, and harmonics as well as other properties. After reception of the modulated carrier, the demodulator recovers the original modulating signal by the process of demodulation or detection. One or more modulators can be integrated with one or more demodulators to form a modulator-demodulator (modem). As such, the term demodulator may further refer to one or more parts, components, and/or software that demodulate within a modem.

"Downshift" generally refers to changing a communication system to a less complex modulation scheme.

"Electromagnet Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source. Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels. The photon is the quantum of the electromagnetic interaction and is the basic constituent of all forms of electromagnetic radiation. The quantum nature of light becomes more apparent at high frequencies as electromagnetic radiation behaves more like particles and less like waves as its frequency increases.

"Electromagnetic Spectrum" generally refers to the range of all possible frequencies of electromagnetic radiation.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Equalizer" generally refers to an electronic and/or software-based filter that modifies the frequency response (amplitude and phase versus frequency) of a system for a specific purpose. Equalizers typically realize a more complicated frequency response in which the amplitude response varies continuously with frequency, amplifying some frequencies and attenuating others. An equalizer may have a response fixed in time or may be automatically and continuously adjusted. However, the frequency response of an equalizer is usually, but not always, matched to some external physical medium, such as a communication channel, and thus adjustable.

"Error Correction Code", "Error Correcting Code", or "ECC" generally refers to data and/or algorithms for expressing a sequence of numbers or other data such that any errors which are introduced can be detected and corrected within certain limitations based on the remaining numbers or data. ECC is typically used for controlling errors in data over unreliable and/or noisy communication channels. For instance, the sender encodes the message with a redundant in the form of an ECC. There are two main categories of ECCs, block codes and convolution codes. Some non-limiting examples of ECC codes include AN, BCH, Berger, constant-weight, convolutional, cyclic redundancy check (CRC), expander, group, Golay, Goppa, Hadamard, Hagelbarger, Hamming code, Latin square based, lexicographic, long, low-density parity-check (i.e., Gallager code), LT, polar, raptor, Reed-Solomon error correction, Reed-Muller, repeat-accumulate, repetition (e.g., triple modular redundancy), spinal, rateless, nonlinear, tornado, near-optimal erasure correcting, turbo code, and Walsh-Hadamard codes.

"Fiber-optic Communication" generally refers to a method of transmitting data from one place to another by sending pulses of electromagnetic energy through an optical fiber. The transmitted energy may form an electromagnetic carrier wave that can be modulated to carry data. Fiber-optic communication lines that use optical fiber cables to transmit data can be configured to have a high data bandwidth. For example, fiber-optic communication lines may have a high data bandwidth of up to about 15 Tbit/s, about 25 Tbit/s, about 100 Tbit/s, about 1 Pbit/s or more. Opto-electronic repeaters may be used along a fiber-optic communication line to convert the electromagnetic energy from one segment of fiber-optic cable into an electrical signal. The repeater can retransmit the electrical signal as electromagnetic energy along another segment of fiber-optic cable at a higher signal strength than it was received.

"Financial Instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Forward Error Correction" or FEC generally refers to a technique used for controlling errors in data transmission over unreliable or noisy communication channels. Typically, but not always, a sender encodes the message in a redundant way by using an error-correction code (ECC). This redundancy allows a receiver to detect a limited number of errors that may occur anywhere in the message, and the redundancy often allows these errors to be corrected without retransmission. FEC gives the receiver the ability to correct errors without needing a reverse channel to request retransmission of data. However, higher forward channel bandwidth is typically required. FEC can be used in situations where retransmissions are costly or impossible, such as one-way communication links and when transmitting to multiple receivers in multicast. FEC is commonly used in modems. FEC information can also be added to mass storage devices to enable recovery of corrupted data. There are generally two types of FEC code categories, block codes and convolution codes. FEC block codes work on fixed-size blocks (or packets) of bits or symbols of predetermined size. Some non-limiting examples of block codes include Reed-Solomon, Golay, BCH, multidimensional parity, and Hamming codes. Typical block codes are usually decoded using hard-decision algorithms in which for every input and output signal a hard decision is made whether it corresponds to a one or a zero bit. Convolutional FEC codes work on bit or symbol streams of arbitrary length. Convolutional codes are typically decoded using soft-decision algorithms like the Viterbi, MAP or BCJR algorithms that process (discretized)

analog signals, and which allow for much higher error-correction performance than hard-decision decoding. Convolutional FEC codes are most often soft decoded with the Viterbi algorithm, though other algorithms can be used. Viterbi decoding allows asymptotically optimal decoding efficiency with increasing constraint length of the convolutional code, but at the expense of exponentially increasing complexity. A convolutional code that is terminated is also a block code in that it encodes a block of input data, but the block size of a convolutional code is generally arbitrary, while block codes have a fixed size dictated by their algebraic characteristics. Types of termination for convolutional codes include tail-biting and bit-flushing. Some other non-limiting examples of FEC techniques include turbo coding, low density parity check (LDPC), interleaving, and local decoding. Many FEC coders (but not all) can also generate a bit-error rate (BER) signal which can be used as feedback to fine-tune the analog receiving electronics.

"Ground" is used more in an electrical/electromagnetic sense and generally refers to the Earth's surface including land and bodies of water, such as oceans, lakes, and rivers.

"Ground-wave Propagation" generally refers to a transmission method in which one or more electromagnetic waves are conducted via the boundary of the ground and atmosphere to travel along the ground. The electromagnetic wave propagates by interacting with the semi-conductive surface of the earth. In essence, the wave clings to the surfaces so as to follow the curvature of the earth. Typically, but not always, the electromagnetic wave is in the form of a ground or surface wave formed by low-frequency radio waves.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those. The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"Inter-symbol Interference" or "ISI" generally refer to a form of distortion of a signal in which one symbol interferes with subsequent symbols. Typically, but not always, ISI is an unwanted phenomenon as the previous symbols have a similar effect as noise which makes communication less reliable. For example, the spreading of a pulse beyond the allotted time interval causes the pulse to interfere with neighboring pulses. ISI is usually, but not always, caused by multipath propagation and/or the inherent linear or non-linear frequency response of a communication channel causing successive symbols to blur together.

"Ionosphere" generally refers to the layer of the Earth's atmosphere that contains a high concentration of ions and free electrons and is able to reflect radio waves. The ionosphere includes the thermosphere as well as parts of the mesosphere and exosphere. The ionosphere extends from about 25 to about 600 miles (about 40 to 1,000 km) above the earth's surface. The ionosphere includes a number of layers that undergo considerable variations in altitude, density, and thickness, depending upon a number of factors including solar activity, such as sunspots.

"Jitter" generally refers to a variable delay in the receipt of a transmitted message. For example, jitter arises as messages arrive at an input at varying intervals, and as a result, the receiver of the message has to wait a variable time before a data slot is available for message transport.

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$latency_{low} \leq \frac{d}{c} \cdot k$$

where:
  d=distance (miles)
  c=the speed of light in a vacuum (186,000 miles/sec)
  k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$latency_{high} > \frac{d}{c} \cdot k$$

where:
  d=distance (miles)
  c=the speed of light in a vacuum (186,000 miles/sec)
  k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Maximum Usable Frequency (MUF)" generally refers to the highest frequency that is returned to the earth using skywave propagation.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Message" generally refers to a discrete unit of communication intended by a source for consumption by a recipient or group of recipients.

"Modem" or "Modulator-Demodulator" generally refers to a device, such as an electronic circuit and/or computer, that performs the functions of modulation and demodulation of a signal such as through a modulator and a demodulator.

"Modulation" generally refers to a process of varying one or more properties of a signal using a separate signal that typically contains information to be transmitted. It may be thought of as merging the properties of two time-varying signals to create a third output signal that is the combination of both input signals. Modulation is useful in the process of conveying data, such as in the case of transmitting a digital bit stream or an analog (continuously varying) signal using electromagnetic energy. Analog modulation may transfer an analog baseband (or low pass) signal, for example an audio signal or TV signal, over an analog bandpass channel at a different frequency, for example over a limited radio frequency band or a cable TV network channel. Digital modulation may transfer a digital bit stream over an analog communication channel, for example over the public switched telephone network (where a bandpass filter limits the frequency range to 300-3400 Hz) or over a limited radio frequency band. Analog and digital modulation facilitate Frequency Division Multiplexing (FDM), where several low pass information signals are transferred simultaneously over the same shared physical medium, using different carrier frequencies. Digital baseband modulation, also known as "line coding", can transfer a digital bit stream over a baseband channel, typically a non-filtered copper wire such as a serial bus or a wired local area network. Pulse modulation may transfer a narrowband analog signal, for example, a phone call over a wideband baseband channel or, in some of the schemes, as a bit stream over another digital transmission system. As used herein, analog modulation techniques may include, but are not limited to, any of the following alone or in combination: 1. Amplitude modulation (AM) (here the amplitude of the carrier signal is varied in accordance with the instantaneous amplitude of the modulating signal) 2. Double-sideband modulation with carrier (DSB-WC) (used on the AM radio broadcasting band) 3. Double-sideband suppressed-carrier transmission (DSB-SC) 4. Double-sideband reduced carrier transmission (DSB-RC) 5. Single-sideband modulation with carrier (SSB-WC) 6. Single-sideband modulation suppressed carrier modulation (SSB-SC) 7. Vestigial sideband modulation (VSB, or VSB-AM) 8. Quadrature amplitude modulation (QAM) 9. Frequency modulation (FM) (here the frequency of the carrier signal is varied in accordance with the instantaneous amplitude of the modulating signal) 10. Phase modulation (PM) (here the phase shift of the carrier signal is varied in accordance with the instantaneous amplitude of the modulating signal) 11. Transpositional Modulation (TM), in which the waveform inflection is modified resulting in a signal where each quarter cycle is transposed in the modulation process. In digital modulation, an analog carrier signal may be modulated by a discrete signal. Digital modulation methods can be considered as digital-to-analog conversion and the corresponding demodulation or detection as analog-to-digital conversion. The changes in the carrier signal are chosen from a finite number of M alternative symbols (the modulation alphabet). As used herein, digital modulation techniques may include, but are not limited to, any of the following used either alone or in combination: 1. Binary PSK (BPSK), using M=2 symbols 2. Quadrature PSK (QPSK), using M=4 symbols 3. 8PSK, using M=8 symbols 4. 16PSK, using M=16 symbols 5. Differential PSK (DPSK) 6. Differential QPSK (DQPSK) 7. Offset QPSK (OQPSK) 8. π/4-QPSK 9. Audio frequency-shift keying (AFSK) 10. Multi-frequency shift keying (M-ary FSK or MFSK) 11. Dual-tone multi-frequency (DTMF) 12. Amplitude-shift keying (ASK) 13. On-off keying (OOK), the most common ASK form 14. M-ary vestigial sideband modulation, for example 8VSB 15. Quadrature amplitude modulation (QAM), a combination of PSK and ASK 16. Polar modulation like QAM a combination of PSK and ASK 17. Minimum-shift keying (MSK) 18. Gaussian minimum-shift keying (GMSK) 19. Continuous-phase frequency-shift keying (CPFSK) 20. Orthogonal frequency-division multiplexing (OFDM) modulation 21. Discrete multitone (DMT), including adaptive modulation and bit-loading 22. Wavelet modulation 23. Trellis coded modulation (TCM), also known as Trellis modulation 24. Direct-sequence spread spectrum (DSSS) 25. Chirp spread spectrum (CSS) according to IEEE 802.15.4a CSS uses pseudo-stochastic coding 26. Frequency-hopping spread spectrum (FHSS) applies a special scheme for channel release "Modulator" generally refers to a device, such as an electronic circuit and/or computer, that varies one or more properties of a periodic waveform, called the carrier signal, with a modulating signal that typically contains information to be transmitted. For example, these properties of the waveform can include amplitude, frequency, phase, and harmonics as well as other properties. By way of a non-limiting example, the modulator can control the parameters of a high-frequency electromagnetic information carrier in accordance with electrical signals of the transmitted message. One or more modulators can be integrated with one or more demodulators to form a modulator-demodulator (modem). As such, the term modulator may further refer to one or more parts, components, and/or software that functions as a modulator within a modem.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Non-skywave propagation" generally refers to all forms of transmission, wired and/or wireless, in which the information is not transmitted by reflecting an electromagnetic wave from the ionosphere.

"Optical Fiber" generally refers to an electromagnetic waveguide having an elongate conduit that includes a substantially transparent medium through which electromagnetic energy travels as it traverses the long axis of the conduit. Electromagnetic radiation may be maintained within the conduit by total internal reflection of the electromagnetic radiation as it traverses the conduit. Total internal reflection is generally achieved using optical fibers that include a substantially transparent core surrounded by a second substantially transparent cladding material with a lower index of refraction than the core.

"Optimum Working Frequency" generally refers to the frequency that provides the most consistent communication path via sky-wave propagation. It can vary over time depending on number of factors, such as ionospheric conditions and time of day. For transmissions using the F2 layer of the ionosphere the working frequency is generally around 85% of the MUF, and for the E layer, the optimum working frequency will generally be near the MUF.

"Packet Error Rate" or "Packet Error Ratio" or "PER" generally refers to the number of incorrectly received data packets divided by the total number of received packets in a digital transmission. Generally, a packet is declared incorrect if at least one bit is erroneous.

"Polarization" generally refers to the orientation of the electric field ("E-plane") of a radiated electromagnetic energy wave with respect to the Earth's surface and is determined by the physical structure and orientation of the radiating antenna. Polarization can be considered separately from an antenna's directionality. Thus, a simple straight wire antenna may have one polarization when mounted substantially vertically, and a different polarization when mounted substantially horizontally. As a transverse wave, the magnetic field of a radio wave is at right angles to that of the electric field, but by convention, talk of an antenna's "polarization" is understood to refer to the direction of the electric field. Reflections generally affect polarization. For radio waves, one important reflector is the ionosphere which can change the wave's polarization. Thus for signals received via reflection by the ionosphere (a skywave), a consistent polarization cannot be expected. For line-of-sight communications or ground wave propagation, horizontally or vertically polarized transmissions generally remain in about the same polarization state at the receiving location.

"Primary Communication Channel" or "Primary Channel" generally refers to a communication pathway that is a first choice for transferring information. Typically, but not always, the primary communication channel has one or more properties, such as latency or bandwidth, that is desirable over others. For example, a primary communication channel can have the highest data rate of all the channels sharing a common interface. A primary communication channel may support the transfer of information in one direction only, either direction alternately, or both directions simultaneously. The primary communication channel can for example include wired and wireless forms of communication.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Pseudorandom Binary Sequence" or "PRBS" generally refers to a binary sequence generated with a deterministic algorithm that is difficult to predict and exhibits statistical behavior similar to a truly random sequence.

"Radio" generally refers to electromagnetic radiation in the frequencies that occupy the range from 3 kHz to 300 GHz.

"Radio horizon" generally refers to the locus of points at which direct rays from an antenna are tangential to the ground. The radio horizon can be approximated by the following equation:

$$d \approx \sqrt{2h_t} + \sqrt{2h_r}$$

where:
d=radio horizon (miles)
$h_t$=transmitting antenna height (feet)
$h_r$=receiving antenna height (feet).

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Satellite Communication" or "Satellite Propagation" generally refers to transmitting one or more electromagnetic signals to a satellite which in turn reflects and/or retransmits the signal to another satellite or station.

"Signal-to-noise ratio" or "SNR" or "S/N" generally refers to a measure that compares a level of a desired signal to a level of background noise. SNR is calculated as the ratio of signal power to noise power, often expressed in decibels. A SNR higher than 1:1 (greater than 0 dB) indicates more signal than noise.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units. For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Skip distance" generally refers to the minimum distance from a transmitter to where a wave from skywave propagation can be returned to the Earth. To put it another way, the skip distance is the minimum distance that occurs at the critical angle for sky-wave propagation.

"Skip Zone" or "Quiet Zone" generally refers to an area between the location where a ground wave from ground wave propagation is completely dissipated and the location where the first skywave returns using skywave propagation. In the skip zone, no signal for a given transmission can be received.

"Skywave Propagation" refers generally to a transmission method in which one or more electromagnetic-waves radiated from an antenna are refracted from the ionosphere back to the ground. Skywave propagation further includes tropospheric scatter transmissions. In one form, a skipping method can be used in which the waves refracted from the ionosphere are reflected by the ground back up to the ionosphere. This skipping can occur more than once.

"Software-Defined Radio" or "SDR" generally refers to a radio communication system where components that have been traditionally implemented in hardware are instead implemented via software on a computer and/or embedded system. Some examples of hardware now implemented as SDR are mixers, filters, amplifiers, modulators/demodulators, detectors, and equalizers, just to name a few.

"Space-wave Propagation" or sometimes referred to as "Direct Wave Propagation" or "Line-of-sight Propagation" generally refers to a transmission method in which one or more electromagnetic waves are transmitted between antennas that are generally visible to one another. The transmission can occur via direct and/or ground reflected space waves. Generally speaking, the antenna height and curvature of the earth are limiting factors for the transmission distances for space-wave propagation. The actual radio horizon for a direct line of sight is larger than the visible or geometric line of sight due to diffraction effects; that is, the radio horizon is about 4/5 greater than the geometric line of sight.

"Spread Spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to reassemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Stratosphere" generally refers to a layer of the earth's atmosphere extending from the troposphere to about 25 to 35 miles above the earth surface.

"Symbol" generally refers to a waveform, a state or a significant condition of the communication channel that persists, for a fixed period of time. For digital baseband transmissions, a symbol may be in the form of a pulse, and a symbol may be in the form of a tone in passband transmissions using modems. A transmitter or other device places symbols on one or more channels, and the receiver detects the sequence of symbols in order to reconstruct the transmitted data. In some cases, there may be a direct correspondence between a symbol and a small unit of data. For instance, each symbol can encode one or several bits. The data may also be represented by the transitions between symbols, and/or by a sequence of several symbols.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Transfer Rate" generally refers to the rate at which something is moved from one physical or logical location to another. In the case of a communication link or communication network, a transfer rate may be characterized as the rate of data transfer over the link or network. Such a transfer rate may be expressed in "bits per second" and may be limited by the maximum data bandwidth for a given network or communication link used to carry out a transfer of data.

"Transmission Line" generally refers to a specialized physical structure or series of structures designed to carry electromagnetic energy from one location to another, usually without radiating the electromagnetic energy through free space. A transmission line operates to retain and transfer electromagnetic energy from one location to another while minimizing latency and power losses incurred as the electromagnetic energy passes through the structures in the transmission line. Examples of transmission lines that may be used in communicating radio waves include twin lead, coaxial cable, microstrip, strip line, twisted-pair, star quad, lecher lines, various types of waveguide, or a simple single wire line. Other types of transmission lines such as optical fibers may be used for carrying higher frequency electromagnetic radiation such as visible or invisible light.

"Transmission Path" or "Propagation Path" generally refers to a path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-sight, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmission Time" generally refers to is the amount of time from the beginning until the end of a message transmission in a communication network. In the case of a digital message, the transmission time is the time from the first bit until the last bit of a message has left the transmitting node. For a digital packet, the packet transmission time can be obtained from the packet size and bit rate. The transmission time should not be confused with propagation delay which refers to the time it takes for the first bit to travel from a sender to a receiver.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Troposphere" generally refers to the lowest portion of the earth's atmosphere. The troposphere extends about 11 miles above the surface of the earth in the mid-latitudes, up to 12 miles in the tropics, and about 4.3 miles in winter at the poles.

"Tropospheric Scatter Transmission" generally refers to a form of skywave propagation in which one or more electromagnetic waves, such as radio waves, are aimed at the troposphere. While not certain as to its cause, a small amount of energy of the waves is scattered forwards to a receiving antenna. Due to severe fading problems, diversity reception techniques (e.g., space, frequency, and/or angle diversity) are typically used.

"Upshift" generally refers to changing a communication system to a more complex modulation scheme.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS

| | | | |
|---|---|---|---|
| 100 | communication system | 260 | client |
| 105 | information source | 264 | connection |
| 110 | information destination | 266 | wireless connection |
| 115 | communication channels | 268 | instruction processor |
| 120 | primary communication channel | 272 | connection |
| 125 | backend communication channel | 405 | modulator |
| 130 | distance | 410 | radio transmitter |
| 135 | primary channel latency | 415 | fiber optic transmitter |

-continued

| | | | |
|---|---|---|---|
| 140 | primary channel bandwidth | 420 | fiber optic cable |
| 145 | backend channel latency | 425 | demodulator |
| 150 | backend channel bandwidth | 430 | radio receiver |
| 200 | communication system | 435 | fiber optic receiver |
| 204 | low latency, low bandwidth communication link | 500 | communication system |
| | | 505 | high speed transmitter data network |
| 206 | HF radio channel | 510 | high speed receiver data network |
| 208 | high latency, high bandwidth communication link | 600 | system delay model |
| | | 605 | competitor network |
| 212 | first communication node | 700 | graph |
| 214 | transmission station | 705 | expected return line |
| 216 | second communication node | 710 | minimum delay advantage point |
| 218 | receiving station | 715 | point of diminishing returns |
| 220 | atmosphere | 720 | target range |
| 224 | electromagnetic waves | 800 | Table 1 |
| 228 | transmitting antenna | 805 | packets/second |
| 232 | receiving antenna | 810 | mode identifiers |
| 236 | transmission line | 815 | mode |
| 240 | transmission line | 820 | modulation method |
| 244 | transmission line | 825 | FEC scheme |
| 252 | repeaters | 830 | CRC scheme |
| 256 | earth | 835 | user payload size |
| 840 | total payload size | 1185 | controller input |
| 845 | encoded bit size | 1200 | chart |
| 850 | payload symbol | 1205 | competitor data arrival time |
| 855 | packet length | 1210 | system data arrival time |
| 860 | data rate | 1215 | system delay advantage |
| 900 | graph | 1220 | double arrow |
| 905 | short transmission path | 1225 | double arrow |
| 910 | medium transition path | 1300 | flowchart |
| 915 | long transmission path | 1305 | stage |
| 1000 | graph | 1310 | stage |
| 1005 | short transmission path | 1315 | stage |
| 1010 | medium transition path | 1320 | stage |
| 1015 | long transmission path | 1325 | stage |
| 1100 | demodulator-equalizer system | 1400 | Table 2 |
| 1105 | data stream | 1500 | flowchart |
| 1110 | demodulator-equalizer units | 1505 | stage |
| 1115 | controller | 1510 | stage |
| 1120 | message validator and selector unit | 1515 | stage |
| 1125 | first demodulator-equalizer unit | 1520 | stage |
| 1130 | second demodulator-equalizer unit | 1525 | stage |
| 1135 | third demodulator-equalizer unit | 1530 | stage |
| 1140 | equalizer | 1535 | stage |
| 1145 | demodulator | 1540 | stage |
| 1150 | first equalizer | 1545 | stage |
| 1155 | first demodulator | 1550 | stage |
| 1160 | second equalizer | 1600 | flowchart |
| 1165 | second demodulator | 1605 | stage |
| 1170 | third equalizer | 1610 | stage |
| 1175 | third demodulator | 1615 | stage |
| 1180 | system output | 1620 | stage |
| | | 1625 | stage |
| | | 1630 | stage |
| | | 1635 | stage |
| | | 1640 | stage |
| | | 1645 | stage |

What is claimed is:

1. A method, comprising:
receiving at a communication system an indicator indicating a change to a different modulation mode will potentially provide a system benefit;
wherein the communication system includes two or more demodulator-equalizer units;
shifting at least one of the demodulator-equalizer units to the different modulation mode;
wherein the indicator includes financial performance of the communication system;
sending a financial instrument transaction instruction via the communication system; and
limiting a number of error corrections per message to less than a maximum possible for a selected decoding scheme.

2. The method of claim 1, wherein the indicator includes signal-to-noise ratio (SNR).

3. The method of claim 1, wherein the indicator includes packet error rate (PER).

4. The method of claim 1, wherein the indicator includes a diminishing returns delay time limit.

5. The method of claim 1, wherein the indicator includes a system delay advantage.

6. The method of claim 1, wherein the indicator includes a minimum delay time limit.

7. The method of claim 1, wherein the indicator includes intersymbol interference (ISI).

8. The method of claim 1, wherein the different modulation mode has higher complexity.

9. The method of claim 8, wherein the system benefit includes higher channel throughput.

10. The method of claim 8, wherein the shifting includes upshifting to the different modulation mode with the higher complexity.

11. The method of claim 1, wherein the different modulation mode has lower complexity.

12. The method of claim 11, wherein the system benefit includes better error performance.

13. The method of claim 11, wherein the shifting includes downshifting to the different modulation mode with the lower complexity.

14. The method of claim 1, further comprising:
probing the different modulation mode with the one of the demodulator-equalizer units before shifting the remaining demodulator-equalizer units.

15. The method of claim 1, wherein the shifting includes changing equalizer processing time in the demodulator-equalizer units.

16. The method of claim 15, wherein the changing the equalizer processing time includes decreasing the equalizer processing time.

17. The method of claim 15, wherein the changing the equalizer processing time includes increasing the equalizer processing time.

18. The method of claim 1, wherein the demodulator-equalizer units include a first demodulator-equalizer unit, a second demodulator-equalizer unit, and a third demodulator-equalizer unit.

19. The method of claim 18, wherein the first demodulator-equalizer unit has an equalizer with an equalizer processing time that is shorter than the other demodulator-equalizer units.

20. The method of claim 19, further comprising:
determining a packet error rate for the first demodulator-equalizer unit is below a minimum limit.

21. The method of claim 20, further comprising:
instructing a modulator at a remote transmitter station to change to the different modulation mode.

22. The method of claim 21, further comprising:
changing the second demodulator-equalizer unit and the third demodulator-equalizer unit to the different modulation mode.

23. The method of claim 22, further comprising:
changing equalizer processing time of the second demodulator-equalizer unit to the short equalizer processing time of the first demodulator-equalizer unit.

24. The method of claim 18, wherein the third demodulator-equalizer unit has a third equalizer with a long equalizer processing time that is longer than the other demodulator-equalizer units.

25. The method of claim 24, further comprising:
determining a packet error rate for the third demodulator-equalizer unit is below a minimum limit.

26. The method of claim 25, further comprising:
changing the first demodulator-equalizer unit and the second demodulator-equalizer unit to the different modulation mode.

27. The method of claim 26, further comprising:
changing equalizer processing time of the second demodulator-equalizer unit to the long equalizer processing time of the third demodulator-equalizer unit.

28. A method, comprising:
receiving at a communication system an indicator indicating a change to a different modulation mode will potentially provide a system benefit;
wherein the communication system includes two or more demodulator-equalizer units;
shifting at least one of the demodulator-equalizer units to the different modulation mode;
wherein the demodulator-equalizer units include a first demodulator-equalizer unit, a second demodulator-equalizer unit, and a third demodulator-equalizer unit; and
wherein the first demodulator-equalizer unit has an equalizer with an equalizer processing time that is shorter than the other demodulator-equalizer units.

29. The method of claim 28, further comprising:
determining a packet error rate for the first demodulator-equalizer unit is below a minimum limit.

30. The method of claim 29, further comprising:
instructing a modulator at a remote transmitter station to change to the different modulation mode.

31. The method of claim 30, further comprising:
changing the second demodulator-equalizer unit and the third demodulator-equalizer unit to the different modulation mode.

32. The method of claim 31, further comprising:
changing equalizer processing time of the second demodulator-equalizer unit to the short equalizer processing time of the first demodulator-equalizer unit.

33. A method, comprising:
receiving at a communication system an indicator indicating a change to a different modulation mode will potentially provide a system benefit;
wherein the communication system includes two or more demodulator-equalizer units;
shifting at least one of the demodulator-equalizer units to the different modulation mode;
wherein the demodulator-equalizer units include a first demodulator-equalizer unit, a second demodulator-equalizer unit, and a third demodulator-equalizer unit; and
wherein the third demodulator-equalizer unit has a third equalizer with a long equalizer processing time that is longer than the other demodulator-equalizer units.

34. The method of claim 33, further comprising:
determining a packet error rate for the third demodulator-equalizer unit is below a minimum limit.

35. The method of claim 34, further comprising:
changing the first demodulator-equalizer unit and the second demodulator-equalizer unit to the different modulation mode.

36. The method of claim 35, further comprising:
changing equalizer processing time of the second demodulator-equalizer unit to the long equalizer processing time of the third demodulator-equalizer unit.

* * * * *